(12) United States Patent
Wei et al.

(10) Patent No.: US 11,044,630 B2
(45) Date of Patent: Jun. 22, 2021

(54) METHOD AND APPARATUS FOR ADJUSTING DATA SENDING RATE OF TERMINAL

(71) Applicant: Huawei Technologies Co., Ltd., Guangdong (CN)

(72) Inventors: Jianguo Wei, Shenzhen (CN); Zhong Zhang, Shenzhen (CN); Neng Yang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 72 days.

(21) Appl. No.: 16/586,042

(22) Filed: Sep. 27, 2019

(65) Prior Publication Data

US 2020/0029243 A1   Jan. 23, 2020

Related U.S. Application Data

(63) Continuation of application No. PCT/CN2018/074339, filed on Jan. 26, 2018.

(30) Foreign Application Priority Data

Mar. 31, 2017   (CN) .......................... 201710209452.4

(51) Int. Cl.
*H04W 28/02* (2009.01)
*H04L 1/00* (2006.01)
(Continued)

(52) U.S. Cl.
CPC ....... *H04W 28/0289* (2013.01); *H04L 1/0002* (2013.01); *H04L 1/0034* (2013.01); *H04L 1/188* (2013.01); *H04L 47/283* (2013.01)

(58) Field of Classification Search
CPC .......................... H04W 28/0289; H04W 28/02; H04L 1/0002; H04L 1/0034; H04L 1/188;
(Continued)

(56) References Cited

U.S. PATENT DOCUMENTS

| 7,035,214 B1 * | 4/2006 | Seddigh | H04L 1/1635 |
| | | | 370/231 |
| 7,617,288 B2 * | 11/2009 | Beyer | H04L 1/002 |
| | | | 709/208 |

(Continued)

FOREIGN PATENT DOCUMENTS

| CN | 102468941 A | 5/2012 |
| CN | 104093169 A | 10/2014 |

(Continued)

OTHER PUBLICATIONS

Feng Lu et al. CQIC: Revisiting Cross-Layer Congestion Control for Cellular Networks, HotMobile'15, Feb. 12-13, 2015, total 6 pages.

*Primary Examiner* — Mohamed A Kamara
(74) *Attorney, Agent, or Firm* — Womble Bond Dickinson (US) LLP

(57) ABSTRACT

This application discloses a method and an apparatus for adjusting a data sending rate. In the method, when determining that a return time of feedback information of a first data packet has timed out, a terminal reduces a data sending rate of a connection to which the first data packet belongs from a first value to a second value. Then the terminal detects return times of feedback information of a plurality of subsequent data packets after the first data packet and determines a cause of the timeout of the feedback information of the first data packet. The terminal further increases a data sending rate from a current third value to a fourth value when determining that the timeout is caused by a packet loss on a wireless link in a communications link.

20 Claims, 10 Drawing Sheets

(51) Int. Cl.
*H04L 1/18* (2006.01)
*H04L 12/841* (2013.01)

(58) Field of Classification Search
CPC ....... H04L 47/283; H04L 1/187; H04L 47/25; H04L 1/1607
See application file for complete search history.

(56) References Cited

U.S. PATENT DOCUMENTS

| | | | |
|---|---|---|---|
| 7,756,082 B1 * | 7/2010 | Dhamdhere | H04W 36/0085 370/331 |
| 2013/0322246 A1 | 12/2013 | Zhou et al. | |
| 2015/0085648 A1 | 3/2015 | Leith | |
| 2019/0268445 A1 | 8/2019 | Zhang et al. | |

FOREIGN PATENT DOCUMENTS

| | | |
|---|---|---|
| CN | 104113884 A | 10/2014 |
| CN | 108023683 A | 5/2018 |

* cited by examiner

METHOD AND APPARATUS FOR ADJUSTING DATA SENDING RATE OF TERMINAL

CROSS-REFERENCE TO RELATED APPLICATIONS

This application is a continuation application of International Application No. PCT/CN2018/074339, filed on Jan. 26, 2018, which claims priority to Chinese Patent Application No. 201710209452.4, filed on Mar. 31, 2017, the disclosures of which are incorporated herein by reference in their entireties.

TECHNICAL FIELD

This application relates to the field of mobile communications technologies, and in particular, to a method and an apparatus for adjusting a data sending rate of a terminal.

BACKGROUND

With rapid development of the Internet, mobile terminals are increasingly popularized. Most of the mobile terminals support a mobile network access function, and usually a Transmission Control Protocol/Internet Protocol (TCP/IP) communication protocol is used in a process of mobile network access of the mobile terminals.

The TCP/IP communication protocol is a connection-oriented, reliable, and byte-stream-based transmission-layer communication protocol. To ensure reliability of the TCP/IP communication protocol, when a destination end receives one data packet or a plurality of preset data packets, the destination end feeds back a message to a source end. The feedback message may be an ACK used to indicate that the destination end correctly receives a data packet sent by the source end. Alternatively, the feedback message may be an NACK used to indicate that the destination end does not correctly receive a data packet sent by the source end and that the destination end requests the source end to re-transmit the data packet. However, after the source end sends the one or the plurality of preset data packets, if a feedback message received by the source end has timed out, the source end may consider that congestion occurs in a current TCP communications link, and reduce a sending rate of the source end. For example, after sending a data packet, if the source end does not receive a feedback message from the destination end for a long time (where in this case, it may be considered that the feedback message has timed out), and the source end may reduce a sending rate from 100 data packets per second to 1 data packet per second. A process in which the source end improves the sending rate after reducing the sending rate is a slow start process. For example, still using the foregoing example, after the source end adjusts the sending rate to 1 data packet per second, the source end continues to monitor the data packet sent at the sending rate of 1 data packet per second, to determine whether the feedback message of the destination end can be normally received. If the feedback message of the destination end can be normally received, the source end improves the sending rate to 2 data packets per second. Then, the source end continues to monitor the data packet sent at the sending rate of 2 data packets per second, to determine whether the feedback message can be normally received. If the feedback message can be normally received, the source end improves the sending rate to 4 data packets per second, and the rest may be deduced by analogy. The sending rate is reduced to a minimum sending rate until the received feedback message has timed out again.

It can be learned that, in the prior art, a rate at which the sending rate is adjusted after the timeout of feedback is relatively slow, making utilization of network transmission resources lower.

SUMMARY

This application provides a method and an apparatus for adjusting a data sending rate of a terminal, to improve utilization of network transmission resources.

According to a first aspect, a method for adjusting a data sending rate of a terminal is provided. The method is applied to a terminal, and the method includes: reducing, by the terminal when determining that a return time of feedback information of a first data packet has timed out, a data sending rate of a connection to which the first data packet belongs from a first value to a second value, where the first data packet is a data packet sent by the terminal to a target device over a communications link, and the communications link includes a wireless link and a wired link; detecting, by the terminal, return times of feedback information of a plurality of subsequent data packets after the first data packet; determining, by the terminal, a cause of the timeout of the feedback information of the first data packet when detecting that the return times of the feedback information of the plurality of subsequent data packets after the first data packet meet a preset return time requirement; and increasing, by the terminal, a data sending rate of the terminal from a current third value to a fourth value when determining that the timeout is caused by a packet loss on the wireless link in the communications link, where the third value is greater than or equal to the second value and is less than the first value.

In this application, by using the foregoing method, a rate at which the sent data packet in the connection can be more quickly improved, to be specific, an uplink data throughput can be more restored, and therefore unnecessary congestion control is reduced and utilization of network transmission resources is improved.

In one embodiment, the fourth value is greater than or equal to the first value, or the fourth value is greater than twice the third value.

In one embodiment, the return time of the feedback information is a round trip time (RTT) of the first data packet corresponding to the feedback information, and that the return of the feedback information of the first data packet has timed out indicates that the RTT of the first data packet has timed out; and the data sending rate of the terminal is a congestion window cwnd of the connection to which the first data packet belongs.

In one embodiment, the terminal includes an application processor and a baseband processor; and the determining, by the terminal, a cause of the timeout of the feedback information of the first data packet when detecting that the return times of the feedback information of the plurality of subsequent data packets after the first data packet meet a preset return time requirement includes: collecting, by the baseband processor, a communication parameter of the wireless link in a time period in which the feedback information of the first data packet has timed out, where the time period of the timeout is a time period from sending the first data packet to the timeout of feedback information to the first data packet; obtaining, by the application processor, the communication parameter of the wireless link when detecting that the return times of the feedback information of the plurality of subsequent data packets after the first data packet meet the preset return time requirement; and determining, by the application processor, the cause of the timeout of the feedback information of the first data packet based on the communication parameter of the wireless link, where the timeout of the feedback information of the first data packet is caused by the packet loss on the wireless link or a packet loss on the wired link.

By using the foregoing method, the baseband processor directly reports the collected communication parameter, and the application processor determines the cause of the timeout of feedback, thereby saving power consumption of the baseband processor.

In one embodiment, the obtaining, by the application processor, the communication parameter of the wireless link when detecting that the return times of the feedback information of the plurality of subsequent data packets after the first data packet meet the preset return time requirement includes: sending, by the application processor, a first request to the baseband processor when detecting that the return times of the feedback information of the plurality of subsequent data packets after the first data packet meet the preset return time requirement, where the first request instructs the baseband processor to report the communication parameter of the wireless link; and receiving, by the application processor, the communication parameter of the wireless link, where the communication parameter is sent by the baseband processor to the application processor according to the first request.

By using the foregoing method, the baseband processor reports the communication parameter only when being triggered by the application processor, and therefore the baseband processor is prevented from frequently reporting the communication parameter.

In one embodiment, the obtaining, by the application processor, the communication parameter of the wireless link when detecting that the return times of the feedback information of the plurality of subsequent data packets after the first data packet meet the preset return time requirement includes: receiving, by the application processor, a plurality of communication parameters, where the plurality of communication parameters are reported to the application processor by the baseband processor when a reporting switch is in an on state; and selecting, by the application processor when detecting that the return times of the feedback information of the plurality of subsequent data packets after the first data packet meet the preset return time requirement, a communication parameter that is in the time period in which feedback information has timed out from the plurality of communication parameters.

By using the foregoing method, the baseband processor reports the communication parameter only when the reporting switch is in an on state, thereby facilitating control of the communication parameter reported by the baseband processor.

In one embodiment, the terminal includes an application processor and a baseband processor; and the determining, by the terminal, a cause of the timeout of the feedback information of the first data packet when detecting that the return times of the feedback information of the plurality of subsequent data packets after the first data packet meet a preset return time requirement includes: collecting, by the baseband processor, a communication parameter of the wireless link in a time period in which the feedback information of the first data packet has timed out, and determining, based on the communication parameter, communication quality of the wireless link that is in the time in which the feedback information has timed out, where the time period of the timeout is a time period from sending the first data packet to the timeout of feedback information to the first data packet; and determining, by the application processor based on the communication quality of the wireless link, a cause of the timeout of the feedback information of the first data packet when detecting that the return times of the feedback information of the plurality of subsequent data packets after the first data packet meet the preset return time requirement, where the timeout of the feedback information of the first data packet is caused by the packet loss on the wireless link or by the packet loss on the wired link.

By using the foregoing method, the baseband processor determines the communication quality based on the communication parameter. The application processor determines a cause of a timeout based on the communication quality. It can be learned that, the baseband processor and the application processor each bear some works, thereby preventing either of the two from being excessively power-consumed.

In one embodiment, the terminal includes an application processor and a baseband processor; and the determining, by the terminal, a cause of the timeout of the feedback information of the first data packet when detecting that the return times of the feedback information of the plurality of subsequent data packets after the first data packet meet a preset return time requirement includes: collecting, by the baseband processor, a communication parameter of the wireless link in a time period in which the feedback information of the first data packet has timed out, and determining a cause of the timeout of feedback information to the first data packet based on the communication parameter, where the timeout of the feedback information of the first data packet is caused by the packet loss on the wireless link or by the packet loss on the wired link; and obtaining, by the application processor, the cause of the timeout of feedback information to the first data packet when detecting that the return times of the feedback information of the plurality of subsequent data packets after the first data packet meet the preset return time requirement.

By using the foregoing method, the baseband processor determines the cause of the timeout of feedback, and therefore power consumption of the application processor is reduced.

In one embodiment, the communication parameter includes at least one of reference signal received power, reference signal received quality, a signal-to-noise ratio, and a wireless link retransmission rate.

According to a second aspect, an apparatus for adjusting a data sending rate of a terminal is provided. The apparatus includes: a sending rate control unit, configured to reduce, when determining that a return time of feedback information of a first data packet has timed out, a data sending rate of a connection to which the first data packet belongs from a first value to a second value, where the first data packet is a data packet sent by the apparatus to a target device over a communications link, and the communications link includes a wireless link and a wired link; a detection unit, configured to detect return times of feedback information of a plurality of subsequent data packets after the first data packet; and a determining unit, configured to determine a cause of the timeout of the feedback information of the first data packet when detecting that the return times of the feedback information of the plurality of subsequent data packets after the first data packet meet a preset return time requirement; where the sending rate control unit is further configured to increase a data sending rate of the terminal from a current third value to a fourth value when determining that the timeout is caused by a packet loss on the wireless link in the communications link, where the third value is greater than or equal to the second value and is less than the first value.

In one embodiment, the fourth value is greater than or equal to the first value, or the fourth value is greater than twice the third value.

In one embodiment, the return time of the feedback information is a round trip time (RTT) of the first data packet corresponding to the feedback information, and that the return of the feedback information of the first data packet has timed out indicates that the RTT of the first data packet has timed out; and the data sending rate of the apparatus is a congestion window cwnd of the connection to which the first data packet belongs.

In one embodiment, the determining unit includes a first determining unit and a second determining unit. The first determining unit is configured to collect a communication parameter of the wireless link in a time period in which the feedback information of the first data packet has timed out, where the time period of the timeout is a time period from sending the first data packet to the timeout of feedback information to the first data packet. The second determining unit is configured to: obtain the communication parameter of the wireless link when detecting that the return times of the feedback information of the plurality of subsequent data packets after the first data packet meet the preset return time requirement; and determine a cause of the timeout of the feedback information of the first data packet based on the communication parameter of the wireless link, where the timeout of the feedback information of the first data packet is caused by the packet loss on the wireless link or a packet loss on the wired link.

In one embodiment, when obtaining the communication parameter of the wireless link when detecting that the return times of the feedback information of the plurality of subsequent data packets after the first data packet meet the preset return time requirement, the second determining unit is configured to: send a first request to the first determining unit when detecting that the return times of the feedback information of the plurality of subsequent data packets after the first data packet meet the preset return time requirement, where the first request instructs the first determining unit to report the communication parameter of the wireless link; and receive the communication parameter of the wireless link, where the communication parameter is sent by the first determining unit to the second determining unit according to the first request.

In one embodiment, when obtaining the communication parameter of the wireless link when detecting that the return times of the feedback information of the plurality of subsequent data packets after the first data packet meet the preset return time requirement, the second determining unit is configured to: receive a plurality of communication parameters, where the plurality of communication parameters are reported by the first determining unit to the second determining unit when a reporting switch is in an on state; and select, when detecting that the return times of the feedback information of the plurality of subsequent data packets after the first data packet meet the preset return time requirement, a communication parameter that is in the time period in which feedback information has timed out from the plurality of communication parameters.

In one embodiment, the processing unit includes a first determining unit and a second determining unit. The first determining unit is configured to: collect a communication parameter of the wireless link in a time period in which the feedback information of the first data packet has timed out; and determine, based on the communication parameter, communication quality of the wireless link that is in the time in which the feedback information has timed out, where the time period of the timeout is a time period from sending the first data packet to the timeout of feedback information to the first data packet. The second determining unit is configured to determine, based on the communication quality of the wireless link, a cause of the timeout of the feedback information of the first data packet when detecting that the return times of the feedback information of the plurality of subsequent data packets after the first data packet meet the preset return time requirement, where the timeout of the feedback information of the first data packet is caused by the packet loss on the wireless link or by the packet loss on the wired link.

In one embodiment, the processing unit includes a first determining unit and a second determining unit. The first determining unit is configured to: collect a communication parameter of the wireless link in a time period in which the feedback information of the first data packet has timed out; and determine a cause of the timeout of feedback information to the first data packet based on the communication parameter, where the timeout of the feedback information of the first data packet is caused by the packet loss on the wireless link or by the packet loss on the wired link. The second determining unit is configured to obtain the cause of the timeout of feedback information to the first data packet when detecting that the return times of the feedback information of the plurality of subsequent data packets after the first data packet meet the preset return time requirement.

In one embodiment, the communication parameter includes at least one of reference signal received power, reference signal received quality, a signal-to-noise ratio, and a wireless link retransmission rate.

Reference may be made between implementation of the apparatus according to any one of the second aspect or the implementations of the second aspect in this application and beneficial effects and implementation of the method according to any one of the first aspect or the implementations of the first aspect in this application and the beneficial effects. Repetitions are not described again.

According to a third aspect, a device for adjusting a data sending rate of a terminal is provided. The device includes a memory, a processor, and a communications interface. The memory, the processor, and the communications interface are connected by using a bus. The memory is configured to store a computer-executable instruction. The processor is configured to invoke the instruction stored in the memory, to perform the method according to any one of the first aspect or the embodiments of the first aspect.

Reference may be made between implementation of the apparatus according to any one of the third aspect or the implementations of the third aspect in this application and beneficial effects and implementation of the method according to any one of the first aspect or the implementations of the first aspect in this application and the beneficial effects. Repetitions are not described again.

According to a fourth aspect, a computer-readable storage medium is provided. The storage medium includes an instruction. The instruction, when run on a computer, enables the computer to perform the method according to any one of the first aspect or the embodiments of the first aspect.

According to a fifth aspect, a chip is provided. The chip establishes a data connection to a network device by using a baseband chip, and the chip includes an application processing unit and a communications interface. The application processing unit is configured to: reduce, when determining that a return time of feedback information of a first data packet has timed out, a data sending rate of a connection to which the first data packet belongs from a first value to a second value, where the first data packet is a data packet sent by the application chip to a target device over a communications link, and the communications link includes a wireless link and a wired link; detect return times of feedback information of a plurality of subsequent data packets after the first data packet; receive, when detecting that the return times of the feedback information of the plurality of subsequent data packets after the first data packet meet a preset return time requirement, a reported parameter from the baseband chip by using the communications interface, where the reported parameter is a communication parameter of the wireless link, the reported parameter is a cause of the timeout of feedback, or the reported parameter is communication quality of the wireless link, and the communication quality of the wireless link is a value used to indicate that the wireless link meets a preset communication requirement or that the wireless link does not meet a preset communication requirement; determine the cause of the timeout of the feedback information of the first data packet based on the reported parameter; and increase a data sending rate from a current third value to a fourth value when determining that the timeout is caused by a packet loss on the wireless link in the communications link, where the third value is greater than or equal to the second value and is less than the first value.

In one embodiment, the fourth value is greater than or equal to the first value, or the fourth value is greater than twice the third value.

In one embodiment, the return time of the feedback information is a round trip time (RTT) of the first data packet corresponding to the feedback information, and that the return of the feedback information of the first data packet has timed out indicates that the RTT of the first data packet has timed out; and the data sending rate is a congestion window cwnd of the connection to which the first data packet belongs.

In one embodiment, the reported parameter is a communication parameter of the wireless link. The receiving, by the application processing unit when detecting that the return times of the feedback information of the plurality of subsequent data packets after the first data packet meet the preset return time requirement, the reported parameter from the baseband chip by using the communications interface includes: receiving, by the application processing unit when detecting that the return times of the feedback information of the plurality of subsequent data packets after the first data packet meet the preset return time requirement, the communication parameter from the baseband chip by using the communications interface. The determining, by the application processing unit, the cause of the timeout of the feedback information of the first data packet based on the reported parameter includes: determining, by the application processing unit, the cause of the timeout of the feedback information of the first data packet based on the communication parameter of the wireless link, where the timeout of the feedback information of the first data packet is caused by the packet loss on the wireless link or a packet loss on the wired link.

In one embodiment, the receiving, by the application processing unit when detecting that the return times of the feedback information of the plurality of subsequent data packets after the first data packet meet the preset return time requirement, the communication parameter from the baseband chip by using the communications interface includes: sending, by the application processing unit when detecting that the return times of the feedback information of the plurality of subsequent data packets after the first data packet meet the preset return time requirement, a first request to the baseband chip by using the communications interface, where the first request instructs the baseband chip to report the communication parameter of the wireless link; and receiving, by the application processing unit, the communication parameter that is of the wireless link and that is sent by the baseband chip.

In one embodiment, the obtaining, by the application processing unit, the communication parameter of the wireless link when detecting that the return times of the feedback information of the plurality of subsequent data packets after the first data packet meet the preset return time requirement includes: receiving, by the application processing unit, a plurality of communication parameters reported by the baseband chip; and selecting, by the application processing unit when detecting that the return times of the feedback information of the plurality of subsequent data packets after the first data packet meet the preset return time requirement, a communication parameter that is in a time period in which the feedback information has timed out from the plurality of communication parameters.

In one embodiment, the reported parameter is the communication quality of the wireless link. The receiving, by the application processing unit when detecting that the return times of the feedback information of the plurality of subsequent data packets after the first data packet meet a preset return time requirement, a reported parameter from the baseband chip by using the communications interface includes: receiving, by the application processing unit when detecting that the return times of the feedback information of the plurality of subsequent data packets after the first data packet meet the preset return time requirement, the communication quality of the wireless link from the baseband chip by using the communications interface. The determining, by the application processing unit, the cause of the timeout of the feedback information of the first data packet based on the reported parameter includes: determining, by the application processing unit, the cause of the timeout of the feedback information of the first data packet based on the communication quality of the wireless link, where the timeout of the feedback information of the first data packet is caused by the packet loss on the wireless link or by the packet loss on the wired link.

In one embodiment, the reported parameter is the cause of the timeout of feedback. The receiving, by the application processing unit when detecting that the return times of the feedback information of the plurality of subsequent data packets after the first data packet meet a preset return time requirement, a reported parameter from the baseband chip by using the communications interface includes: receiving, by the application processing unit when detecting that the return times of the feedback information of the plurality of subsequent data packets after the first data packet meet the preset return time requirement, the cause of the timeout of feedback from the baseband chip by using the communications interface, where the timeout of the feedback information of the first data packet is caused by the packet loss on the wireless link or by the packet loss on the wired link. The determining, by the application processing unit, the cause of the timeout of the feedback information of the first data packet based on the reported parameter includes:

using, by the application processing unit, the received cause of the timeout of the feedback information as the cause of the timeout of the feedback information of the first data packet.

In one embodiment, the communication parameter includes at least one of reference signal received power, reference signal received quality, a signal-to-noise ratio, and a wireless link retransmission rate.

Reference may be made between implementation of the apparatus according to any one of the fifth aspect or the implementations of the fifth aspect in this application and beneficial effects and implementation of the method according to any one of the first aspect or the implementations of the first aspect in this application and the beneficial effects. Repetitions are not described again.

According to a sixth aspect, a chip is provided. The chip includes a baseband processing unit and a communications interface. The baseband processing unit is configured to: determine a reported parameter; send the reported parameter to an application chip by using the communications interface, so that the application chip adjusts, based on the reported parameter, a rate of sending data to a target device; and send to-be-sent data that is of the communications link and that is received from the application chip to the target device, where the communications link between the chip and the target device includes a wired link and a wireless link, the reported parameter is any one of the following parameters: a communication parameter of the wireless link, a cause of a timeout of return times of feedback information in the communications link, or communication quality of the wireless link, where the communication quality of the wireless link is a value used to indicate that the wireless link meets a preset communication requirement or that the wireless link does not meet a preset communication requirement.

In one embodiment, the reported parameter is the communication quality of the wireless link. The determining, by the baseband processing unit, a reported parameter includes: collecting, by the baseband processing unit, the communication parameter of the wireless link.

In one embodiment, the reported parameter is a cause of the timeout of feedback of the wireless link. The determining, by the baseband processing unit, a reported parameter includes: collecting, by the baseband processing unit, the communication parameter of the wireless link; and determining, by the baseband processing unit, the cause of the timeout of feedback based on the communication parameter of the wireless link, where the timeout of feedback is caused by a packet loss on the wireless link or a packet loss on the wired link.

In one embodiment, the reported parameter is the communication quality of the wireless link.

The determining, by the baseband processing unit, a reported parameter includes: collecting, by the baseband processing unit, the communication parameter of the wireless link; and determining, by the baseband processing unit, the communication quality of the wireless link based on the communication parameter of the wireless link.

In one embodiment, the communication parameter includes at least one of reference signal received power, reference signal received quality, a signal-to-noise ratio, and a wireless link retransmission rate.

Reference may be made between implementation of the apparatus according to any one of the sixth aspect or the implementations of the sixth aspect in this application and beneficial effects and implementation of the method according to any one of the first aspect or the implementations of the first aspect in this application and the beneficial effects. Repetitions are not described again.

According to a seventh aspect, a chip is provided. The chip includes an application processing unit and a baseband processing unit. The application processing unit is configured to: reduce, when determining that a return time of feedback information of a first data packet has timed out, a data sending rate of a connection to which the first data packet belongs from a first value to a second value, where the first data packet is a data packet sent by the terminal to a target device over a communications link, and the communications link includes a wireless link and a wired link; detect return times of feedback information of a plurality of subsequent data packets after the first data packet; determine, when detecting that the return times of the feedback information of the plurality of subsequent data packets after the first data packet meet a preset return time requirement, a cause of the timeout of the feedback information of the first data packet by using the baseband processing unit; and increase a data sending rate of the terminal from a current third value to a fourth value when determining that the timeout is caused by a packet loss on the wireless link in the communications link, where the third value is greater than or equal to the second value and is less than the first value.

In one embodiment, the fourth value is greater than or equal to the first value, or the fourth value is greater than twice the third value.

In one embodiment, the return time of the feedback information is a round trip time (RTT) of the first data packet corresponding to the feedback information, and that the return of the feedback information of the first data packet has timed out indicates that the RTT of the first data packet has timed out; and the data sending rate of the terminal is a congestion window cwnd of the connection to which the first data packet belongs.

In one embodiment, the determining, by the application processing unit when detecting that the return times of the feedback information of the plurality of subsequent data packets after the first data packet meet a preset return time requirement, a cause of the timeout of the feedback information of the first data packet by using the baseband processing unit includes: collecting, by the baseband processing unit, the communication parameter of the wireless link in a time period in which the feedback information of the first data packet has timed out, where the time period of the timeout is a time period from sending the first data packet to the timeout of feedback information to the first data packet; obtaining, by the application processing unit, the communication parameter of the wireless link when detecting that the return times of the feedback information of the plurality of subsequent data packets after the first data packet meet the preset return time requirement; and determining, by the application processing unit, the cause of the timeout of the feedback information of the first data packet based on the communication parameter of the wireless link, where the timeout of the feedback information of the first data packet is caused by the packet loss on the wireless link or a packet loss on the wired link.

In one embodiment, the obtaining, by the application processing unit, the communication parameter of the wireless link when detecting that the return times of the feedback information of the plurality of subsequent data packets after the first data packet meet the preset return time requirement includes: sending, by the application processing unit, a first request to the baseband processing unit when detecting that the return times of the feedback information of the plurality of subsequent data packets after the first data packet meet the preset return time requirement, where the first request instructs the baseband processing unit to report the communication parameter of the wireless link; and receiving, by the application processing unit, the communication parameter of the wireless link, where the communication parameter is sent by the baseband processing unit to the application processing unit according to the first request.

In one embodiment, the obtaining, by the application processing unit, the communication parameter of the wireless link when detecting that the return times of the feedback information of the plurality of subsequent data packets after the first data packet meet the preset return time requirement includes: receiving, by the application processing unit, a plurality of communication parameters, where the plurality of communication parameters are reported by the baseband processing unit to the application processing unit when a reporting switch is in an on state; and selecting, by the application processing unit when detecting that the return times of the feedback information of the plurality of subsequent data packets after the first data packet meet the preset return time requirement, a communication parameter that is in the time period in which feedback information has timed out from the plurality of communication parameters.

In one embodiment, the determining, by the application processing chip when detecting that the return times of the feedback information of the plurality of subsequent data packets after the first data packet meet a preset return time requirement, a cause of the timeout of the feedback information of the first data packet by using the baseband processing unit includes: collecting, by the baseband processing unit, the communication parameter of the wireless link in a time period in which the feedback information of the first data packet has timed out; and determining, based on the communication parameter, communication quality of the wireless link that is in the time in which the feedback information has timed out, where the time period of the timeout is a time period from sending the first data packet to the timeout of feedback information to the first data packet; and determining, by the application processing unit based on the communication quality of the wireless link, a cause of the timeout of the feedback information of the first data packet when detecting that the return times of the feedback information of the plurality of subsequent data packets after the first data packet meet the preset return time requirement, where the timeout of the feedback information of the first data packet is caused by the packet loss on the wireless link or by the packet loss on the wired link.

In one embodiment, the determining, by the application processing unit when detecting that the return times of the feedback information of the plurality of subsequent data packets after the first data packet meet a preset return time requirement, a cause of the timeout of the feedback information of the first data packet by using the baseband processing unit includes: collecting, by the baseband processing unit, the communication parameter of the wireless link in a time period in which the feedback information of the first data packet has timed out; and determining a cause of the timeout of feedback information to the first data packet based on the communication parameter, where the timeout of the feedback information of the first data packet is caused by the packet loss on the wireless link or by the packet loss on the wired link; and obtaining, by the application processing unit, the cause of the timeout of feedback information to the first data packet when detecting that the return times of the feedback information of the plurality of subsequent data packets after the first data packet meet the preset return time requirement.

In one embodiment, the communication parameter includes at least one of reference signal received power, reference signal received quality, a signal-to-noise ratio, and a wireless link retransmission rate.

In this application, when the feedback information has timed out, first a rate at which a data packet is sent is reduced from a first value to a second value, and then a cause of the timeout of feedback is determined. When the timeout of feedback is caused by a packet loss on a wireless link of the connection, the rate at which the data packet is sent by a terminal is directly increased from a third value to a fourth value, instead of slowly increasing the rate at which the data packet that belongs to the connection is sent by the terminal according to a congestion control policy in the prior art. To be specific, for the timeout of feedback that is not caused by network congestion, the data packet sending rate of the connection can be increased more quickly, that is, an uplink data throughput can be restored more quickly, to reduce unnecessary congestion control and improve utilization of network transmission resources.

DESCRIPTION OF EMBODIMENTS

For ease of understanding, first, some technical terms used in this application are specifically explained as follows.

A round trip time (RTT) is total duration experienced by a source end from sending a data packet to receiving feedback information of the data packet from a destination end.

A congestion window (cwnd) is a quantity of data packets sent by a source end in an RTT time period when the source end of data enters a congestion control state during TCP data transmission. Backoff of the congestion window means that the source end of the data reduces the congestion window when network congestion occurs.

Reference signal received power (RSRP) is an average value of signal power received on all resource elements in a symbol that carry reference signals.

Reference signal received quality (RSRQ): RSRQ=RSRP*NPRB/RSSI, RSRQ represents reference signal received quality, NPRB represents a total quantity of physical time-frequency resources required in downlink transmission, and RSSI is a received signal strength indicator.

A signal to interference plus noise ratio (SINR) represents a ratio of strength of a received wanted signal to strength of received interference noise.

A radio link control (RLC) retransmission rate is a ratio of a quantity of data packets that are retransmitted due to a packet loss on a RLC layer and a lower layer to a total quantity of sent data packets.

Figure 1:
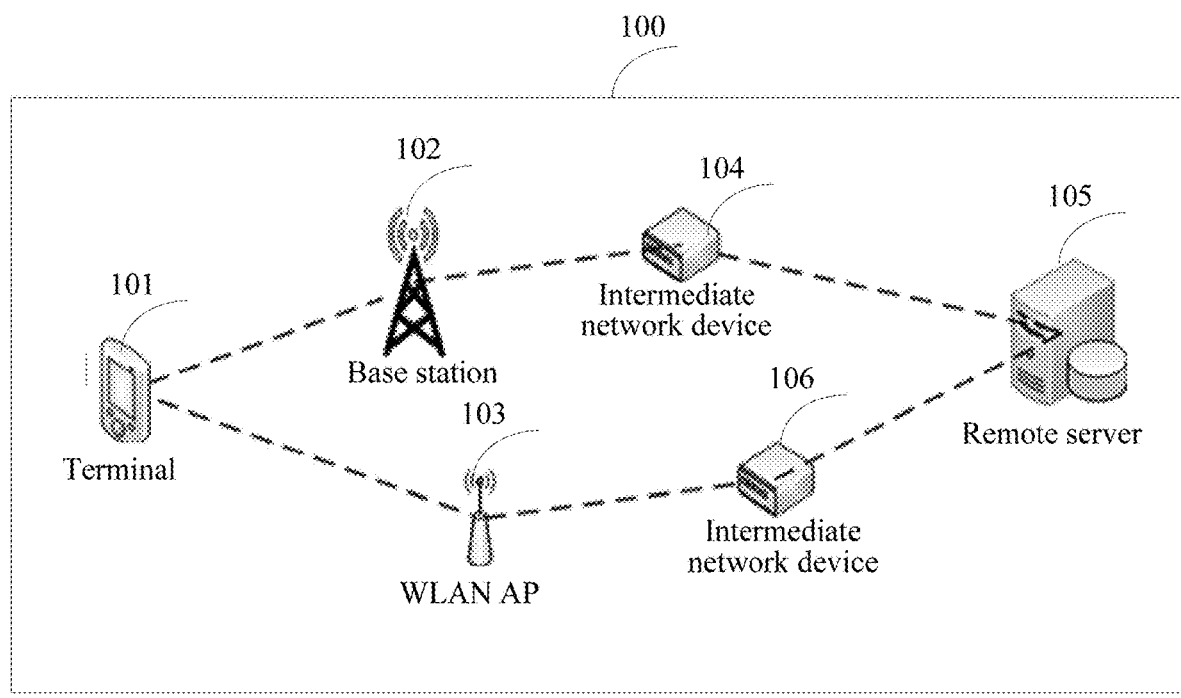
FIG. 1 is a schematic diagram of a wireless system networking structure according to one embodiment.

To describe the technical solutions of this application more clearly, as shown in FIG. 1, this application provides a wireless communications system 100. The wireless communications system 100 is merely used as an application scenario of this application and should not be construed as a limitation to application scenarios of this application.

Still referring to FIG. 1, the wireless communications system 100 may include a terminal 101, a base station 102, a wireless access point 103, an intermediate network device 104, and a remote server 105. A communications link between the terminal 101 and the base station 102 is a wireless link, and a communications link between the terminal 101 and the wireless access point 103 is a wireless link. A communications link between the base station 102 and the intermediate network device 104 is a wired link, a communications link between the wireless access point 103 and the intermediate network device 104 is a wired link, and a communications link between the intermediate network device 104 and the remote server 105 is a wired link.

It should be noted that, the terminal 101 may be a mobile terminal, for example, may be a portable, wearable, or vehicle-mounted mobile device such as a mobile phone, a tablet computer, an action camera, or a notebook computer, or may be some devices such as computers or servers that can access a cellular network, or may even be network devices such as routers or gateways that can access a cellular network, for example, a router or a gateway that can use a subscriber identification module (SIM) card. An example of a mobile phone is used for description in the embodiments of the present disclosure.

The base station 102 may be a device configured to communicate with the terminal, and may be, for example, a base transceiver station ("BTS" for short) in a GSM system or a CDMA system, a NodeB ("NB" for short) in a WCDMA system, or an evolved NodeB ("eNB" or "eNodeB" for short) in an LTE system, or may further be a terminal implementing a function of a network device during device to device (D2D) communication. The network device may be a relay station, an access point, an in-vehicle device, a transmission point, a wearable device, a network side device in a future 5G network, a network device in a future evolved PLMN network, a device implementing a network function, or the like.

The wireless access point 103, commonly known as a "hotspot", may be an access point of a wireless network, and is mainly configured to convert a wired network into a wireless network to expand network coverage. For example, the wireless access point 103 may be a wireless local area network access point (WLAN AP) or an access point in another form.

The intermediate network device 104 is mainly configured to perform protocol conversion on a transmitted data packet and perform routing. For example, the intermediate network device may be a device such as a gateway, a router, or a switch.

The remote server 105 may be an application server, a server agent, a data center server, and the like. It can be learned that, when the terminal 101 communicates with the remote server 105, the communications link between the terminal 101 and the remote server 105 includes a wireless link and a wired link. A communications link between the terminal 101 and the base station 102 is a wireless link, and a communications link between the terminal 101 and the WLAN AP 103 is a wireless link. A communications link between the base station 102 and the remote server 105 is a wired link, and a communications link between the WLAN AP 103 and the remote server 105 is a wired link. During actual application, when a wireless network between the terminal 101 and the base station 102 or a wireless network between the terminal 101 and the WLAN AP 103 is unstable or is disconnected, a baseband processor (Modem) in the terminal 101 actively discards a data packet. Herein, a packet loss caused by the instability or disconnection of the wireless network is referred to as a wireless packet loss. In a process in which the base station 102 communicates with the remote server 105 by using the intermediate network device 104, if data congestion occurs in the intermediate network device 104, the intermediate network device 1104 also actively discards a data packet. Likewise, in a process in which the WLAN AP 103 communicates with the remote server 105 by using an intermediate network device 106, the intermediate network device 106 also actively discards a data packet due to congestion. In this application, a packet loss caused by network congestion is referred to as a wired packet loss. It should be noted that, the intermediate network device 104 and the intermediate network device 106 may be a same component, for example, may be a switch or a router. Alternatively, the intermediate network device 104 and the intermediate network device 106 may be a unified name of a plurality of components, for example, may be a unified name of a switch, a router, and a wireless control device.

It should be noted that, a communications system may include more or fewer components than those shown in FIG. 1, or includes components different from those shown in FIG. 1. FIG. 1 merely shows components that are more relevant to the implementations disclosed in the embodiments of this application. For example, although FIG. 1 shows one remote server 105, people skilled in the art may understand that one communications system may include any quantity of servers. In the prior art, to ensure communication reliability, when the terminal 101 communicates with the remote server 105, the terminal 101 and the remote server 105 may use a TCP communication protocol. In a TCP communications device, when the terminal 101 is used as a source device to send a data packet to the remote server 105, after the remote server 105 receives the data packet, the remote server 105 feeds back a message to the terminal 101, to notify the terminal 101 that the remote server 105 has correctly received the data packet. The feedback message may be an ACK or an NACK. The ACK may indicate that the remote server 105 has correctly received the data packet, and the NACK may indicate that the remote server 105 incorrectly receives the data packet and requests retransmission of the data packet.

It can be learned from FIG. 1 that regardless of whether the data packet is sent by the terminal 101 by using the base station 102 or by using the wireless access point 103, the data packet, before reaching the remote server 105, needs to be transmitted over the wireless link and the wired link. Likewise, the information fed back by the remote server 105 to the terminal 101 needs to be transmitted over the wireless link and the wired link before reaching the terminal 101. However, during actual application, when communication quality of the wireless link deteriorates, a wireless packet loss may occur. When the wired link is congested, a device in the wired link may actively lose a packet. It can be learned that, in the foregoing two cases, the data packet sent by the terminal 101 may be discarded in the transmission process and is not transmitted to the remote server 105.

Based on the foregoing case, in an existing TCP connection, when sending a data packet, the terminal 101 sets feedback information receiving duration, for example, 5s. If the terminal 101 does not receive feedback information for the data packet in 5s, it may be considered that the data packet is discarded, and then the data packet is retransmitted.

It should be noted that, the TCP communication protocol is initially designed for the wired network. When a packet loss is generated on a terminal side, that is, the feedback information has timed out, it may be considered that the timeout is caused by congestion of the wired network, that is, caused by an excessively large quantity of data packets that are currently transmitted in the wired network. In this case, a congestion control policy is used. In this congestion control policy, a physical quantity used to indicate a data sending rate of a terminal is a congestion window cwnd of one connection. The congestion control policy is as follows.

When the terminal detects that feedback information of one or more pieces of sent data has timed out, the terminal side enters a loss state. In the state, the cwnd is set to 1, and the lost data packet is re-transmitted. A larger value of the cwnd indicates a higher rate of sending the data packet by the terminal, to be specific, a larger quantity of data packets are sent in one RTT. In the prior art, the terminal sends data packets by using "RTT" as a unit, that is, sends a plurality of data packets to the remote server 105 in an RTT. The remote server 105 may send feedback information to the terminal for the plurality of sent data packets.

In the prior art, after the cwnd is set to 1, to avoid that congestion occurs again due to sudden injection of a large amount of data into a network, the following slow start process that may be, for example, as follows is used to gradually increase the cwnd.

After sending a data packet at a rate corresponding to the cwnd of 1, the terminal checks whether feedback information of a data packet sent at a first rate in an RTT time period has timed out; and if the feedback information of the data packet sent at the first rate in the RTT time period does not time out, the terminal sets the value of the cwnd to 2. Then, the terminal checks whether feedback information in an RTT time period has timed out; and if the feedback information in the RTT time period does not time out, the terminal sets the value of the cwnd to 4. The rest may be deduced by analogy. The cwnd is set to 1 again until feedback information of a data packet sent by the terminal has timed out again.

By using the foregoing method, congestion caused by a wired link can be perfectly resolved, and a data amount of data packets sent by the terminal can be the maximum. However, for the foregoing wireless communications system 100, the communications link between the terminal 101 and the remote server 105 includes the wireless link and the wired link, if the foregoing congestion control policy is used for the timeout of feedback caused by a wireless packet loss, an uplink throughput of the terminal is lower, making utilization of network transmission resources lower. However, in the prior art, whether the timeout of feedback of the terminal is caused by a wireless packet loss or a wired packet loss is not distinguished. After the cwnd is set to 1, the foregoing slow start policy is started, so that the uplink throughput of the terminal is lower and utilization of network transmission resources is lower.

It should be understood that, the data sending rate of the terminal may further be indicated by another physical quantity, for example, a quantity of data packets that are sent in a connection per second or an amount of data sent in a connection per second. This is not limited in this application. In addition, for ease of understanding, descriptions are provided below by using a cwnd as an example.

Based on the foregoing scenario, this application provides a method for adjusting a data sending rate of a terminal. A main principle of the method is as follows. When the terminal detects that the feedback information has timed out, to ensure normal communication of the terminal, first a congestion control policy is performed, a cwnd is set to 1, and a data packet is re-transmitted. Then, whether the feedback information has timed out is caused by a wireless packet loss or a wired packet loss is determined. For the timeout of the feedback information caused by the wired packet loss, the slow start policy in the prior art may be directly used. For the timeout of the feedback information caused by the wireless packet loss, the foregoing slow start policy is also performed first, but a difference lies in that, in this slow start process, a return time of feedback information of sending a data packet by the terminal is continuously monitored. When return time of feedback information of a plurality of data packets that are continuously sent meet a preset return time requirement, the cwnd is directly adjusted to a larger value, instead of performing an operation of gradually increasing the cwnd in the slow start policy.

Figure 2:
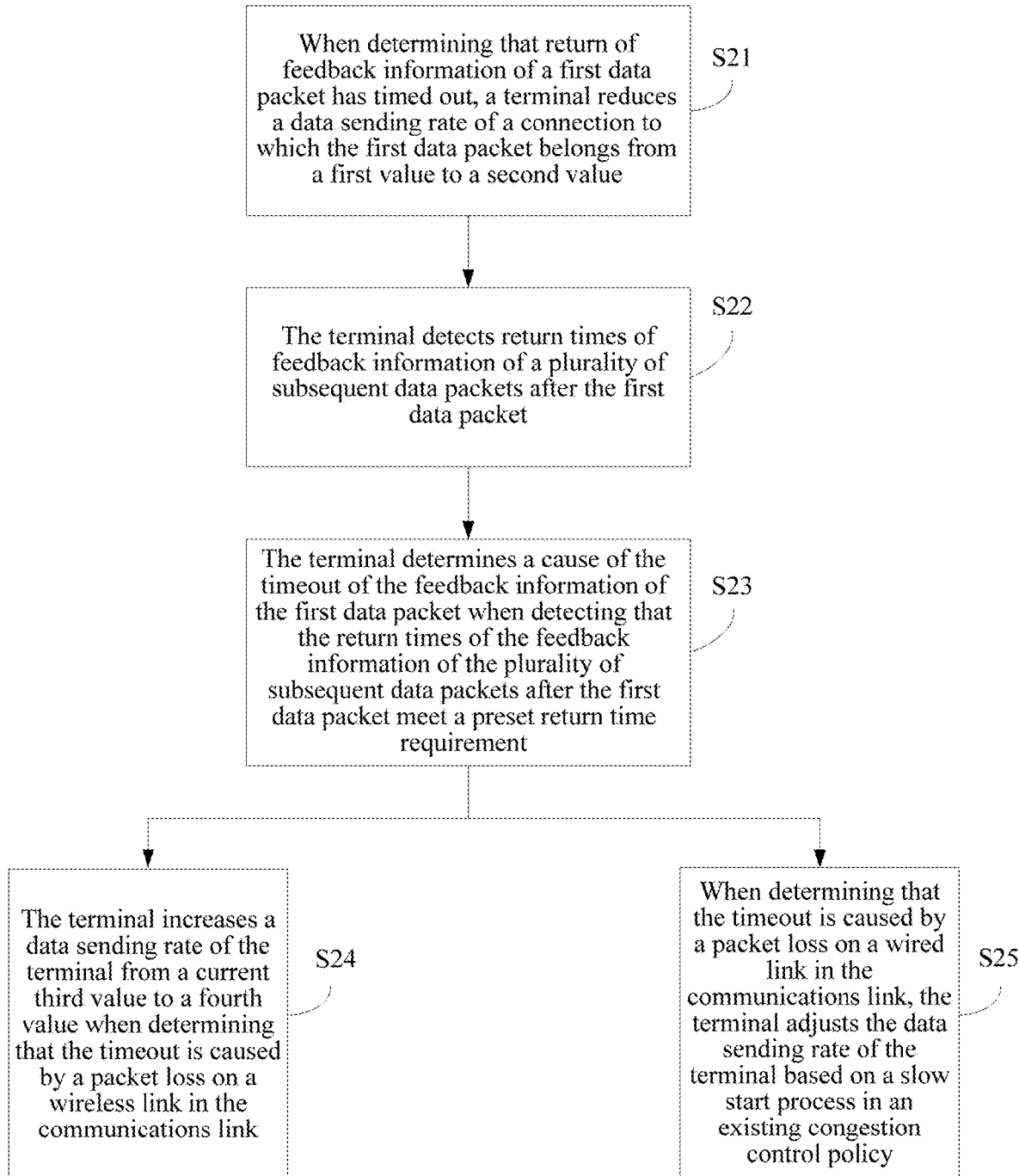
FIG. 2 is a flowchart of a method for adjusting a data sending rate of a terminal according to one embodiment.

Referring to FIG. 2, the method for adjusting a data sending rate of a terminal provided in this application may be performed by the terminal. For example, the terminal 101 shown in FIG. 1 may be configured to be a functional module configured to perform a procedure shown in FIG. 2, and the functional module may be implemented by hardware, a software program, or a combination of software and hardware.

The method for adjusting a data sending rate of a terminal provided in this application is described with reference to FIG. 2. It should be understood that, FIG. 2 is merely for ease of understanding and cannot limit steps of this application.

Step S21: When determining that return of feedback information of a first data packet has timed out, a terminal reduces a data sending rate of a connection to which the first data packet belongs from a first value to a second value.

The first data packet is a data packet sent by the terminal to a target device over a communications link, and the communications link includes a wireless link and a wired link.

Step S22: The terminal detects return times of feedback information of a plurality of subsequent data packets after the first data packet.

Step S23: The terminal determines a cause of the timeout of the feedback information of the first data packet when detecting that the return times of the feedback information of the plurality of subsequent data packets after the first data packet meet a preset return time requirement.

In one embodiment, the return time of the foregoing feedback information is an RTT of a data packet corresponding to the feedback information, and that the return of the feedback information of the first data packet indicates that the RTT of the first data packet has timed out. The preset return time requirement may be that RTTs of two continuously sent data packets apparently decrease.

It should be understood that, a physical quantity or an information form used to indicate the return time of the feedback information is not limited in this application. The return time of the feedback information may substantially reflect a transmission delay of the feedback information or a loss of a data packet corresponding to the feedback information. For example, in another embodiment, the return time of the feedback information merely indicates a transmission time of the feedback information. A sending time of the feedback information may be added to the feedback information. After receiving the feedback information, the terminal may calculate the transmission time of the feedback information based on a receiving time of the feedback information and the sending time carried in the feedback information.

Referring to the example shown in FIG. 1, the terminal is the terminal 101 in FIG. 1, and the target device is the remote server 105 shown in FIG. 1. It can be learned that, a communications link between the terminal 101 and the remote server 105 includes a wireless link and a wired link. In this application, if RTTs of two data packets that are continuously sent apparently decrease, the entire communications link is smooth currently, to be specific, the communication quality of the wireless link is good and the wired link is not congested.

In an example, that the RTT apparently decreases may be but is not limited to that an RTT of a second data packet is less than N times an RTT of a third data packet. The second data packet and the third data packet are two data packets that are continuously sent by the terminal, and the third data packet is sent earlier than the second data packet, where N is greater than 2. For example, N is 2, and the RTTs of the two data packets that are continuously sent by the terminal are respectively 1s and 3s. A data packet whose RTT is 3s is the data packet sent first, and a data packet whose RTT is 1s is the data packet sent later. Therefore, the RTT of 1s of the data packet sent later is less than twice the RTT of 3s of the data packet sent first, and it may be considered that the RTT of a data packet currently sent by the terminal apparently decreases. For example, in a special scenario, N may be of a value less than or equal to 2. For example, N may be of a value of 1.9, 1.86, 1.73, or even 1.5. However, people skilled in the art should know that when N is of a value between 1 and 2 (excluding 1 and 2), usually it is not considered that the RTT apparently decreases.

In another example, that the RTT apparently decreases may be but is not limited to that a difference between an RTT of a second data packet and an RTT of a third data packet is greater than M. M is greater than 1, the second data packet and the third data packet are two data packets that are continuously sent by the terminal, and the third data packet is sent earlier than the second data packet. For example, M is 3, the RTTs of the two data packets that are continuously sent by the terminal are respectively 2s and 8s. A data packet whose RTT is 8s is the data packet sent first, and a data packet whose RTT is 2s is the data packet sent later. Therefore, the RTT of 2s of the data packet sent later is less than the RTT of 8s of the data packet sent first by 6s, and the requirement that the RTT difference M is greater than 3 is met. In this case, it may be considered that currently the RTT of the data packet apparently decreases. For example, in a special scenario, N may be of a value less than or equal to 1. For example, N may be of a value of 0.8, 0.5, or even 0.3.

However, persons skilled in the art know that, when N is of a value between 0 and 1 (excluding 0 and 1), and especially of a value approaching to 0, for example, 0.1 or 0.05, usually it is not considered that the RTT apparently decreases.

Step S24: The terminal increases a data sending rate of the terminal from a current third value to a fourth value when determining that the timeout is caused by a packet loss on a wireless link in a communications link.

The third value is greater than or equal to the second value and is less than the first value, and the fourth value may be greater than or equal to the first value, or the fourth value may be greater than twice the third value.

Step S25: When determining that the timeout is caused by a packet loss on a wired link in the communications link, the terminal adjusts the data sending rate of the terminal based on a slow start process in an existing congestion control policy.

It should be noted that, the data sending rate of the terminal in step S21 to step S25 is a cwnd of a connection to which the first data packet belongs.

Herein, the slow start process in the existing congestion control policy in step S25 may be as follows. For example, when an RTT in which the terminal sends a data packet has timed out, a cwnd of a connection to which the data packet belongs is set to 1. Then, it is checked whether an RTT that is of a data packet sent when the cwnd is 1 has timed out; and if the RTT that is of the data packet sent when the cwnd is 1 does not time out, the cwnd is set to 2. Then, it is checked whether an RTT that is of a data packet sent when the cwnd is 2 has timed out; and if the RTT that is of the data packet sent when the cwnd is 2 does not time out, the cwnd is set to 4. The rest may be deduced by analogy, until the RTT of the data packet has timed out again.

It should be noted that, the foregoing terminal may include two processors: an application processor and a baseband processor, and an implementation process of step S23 may be but is not limited to the following implementations.

First. The baseband processor collects a communication parameter, and the application processor determines a cause of a timeout of feedback to a first data packet based on the communication parameter. This is as follows:

collecting, by the baseband processor, a communication parameter of the wireless link in a time period in which the feedback information of the first data packet has timed out, where the time period of the timeout is a time period from sending the first data packet to the timeout of feedback information to the first data packet; obtaining, by the application processor, the communication parameter of the wireless link when detecting that the return times of the feedback information of the plurality of subsequent data packets after the first data packet meet the preset return time requirement; and determining, by the application processor, the cause of the timeout of the feedback information of the first data packet based on the communication parameter of the wireless link, where the timeout of the feedback information of the first data packet is caused by the packet loss on the wireless link or a packet loss on the wired link.

In one embodiment, a process in which the baseband processor reports the communication parameter includes but is not limited to the following several implementations. 1. The application processor sends a first request to the baseband processor when detecting that the return times of the feedback information of the plurality of subsequent data packets after the first data packet meet the preset return time requirement, where the first request instructs the baseband processor to report the communication parameter of the wireless link; and the baseband processor reports the communication parameter to the application processor when receiving the first request. 2. The baseband processor is provided with a reporting switch. When the reporting switch is in an on state, a plurality of communication parameters are reported to the application processor. When the application processor detects that return times of feedback information of a plurality of subsequent data packets after the first data packet meet a preset return time requirement, the application processor selects a communication parameter that is in a time period in which the feedback information has timed out from the plurality of communication parameters. The reporting switch of the baseband processor may have two states: an on state (for example, ON) and an off state (for example, OFF). The reporting switch may be triggered by the baseband processor periodically, or the reporting switch is triggered when the baseband processor receives the first request of the application processor. Triggering of the reporting switch has a validity, and once a preset validity expires, the reporting switch automatically turns off. To be specific, after the reporting switch is triggered, the reporting switch is turned on, and the communication parameter is reported. When the reporting switch is turned on for a preset time, the reporting switch automatically turns off.

Second. The baseband processor collects a communication parameter, determines the cause of the timeout of feedback information to the first data packet based on the communication parameter, and reports the cause of the timeout of feedback information to the first data packet to the application processor. This is as follows:

collecting, by the baseband processor, a communication parameter of the wireless link in a time period in which the feedback information of the first data packet has timed out, determining the cause of the timeout of feedback information to the first data packet based on the communication parameter, and reporting the cause of the timeout of feedback information to the first data packet, where the timeout of the feedback information of the first data packet is caused by the packet loss on the wireless link or by the packet loss on the wired link; receiving, by the application processor, the cause of the timeout of feedback information to the first data packet. It should be understood that, the foregoing cause of the timeout of feedback may be a flag, and the flag may indicate a wireless packet loss or a wired packet loss. Alternatively, the foregoing cause of the timeout of feedback may further be indicated by using several bytes of data. For example, the wireless packet loss is indicated by using a specific combination of several bytes of data, and the wired packet loss is indicated by using another specific combination. For example, the wireless packet loss is indicated by using 00 and the wired packet loss is indicated by using 01.

In one embodiment, a process in which the baseband processor reports a cause of the timeout may include but is not limited to the following several implementations. 1 The application processor sends a first request to the baseband processor when detecting that the return times of the feedback information of the plurality of subsequent data packets after the first data packet meet the preset return time requirement, and the first request instructs the baseband processor to report a cause of the timeout. When receiving the first request, the baseband processor reports the cause of the timeout to the application processor. 2. The baseband processor is provided with a reporting switch. When the reporting switch is in an on state, the cause of the timeout is reported to the application processor. The reporting switch of the baseband processor may have two states: an on state (for example, ON) and an off state (for example, OFF). The reporting switch may be triggered by the baseband processor periodically, or the reporting switch is triggered when the baseband processor receives the first request of the application processor. Triggering of the reporting switch has a validity, and once a preset validity expires, the reporting switch automatically turns off. For example, after the reporting switch is triggered, the reporting switch is turned on, and the communication parameter is reported. When the reporting switch is turned on for a preset time, the reporting switch automatically turns off.

Third. The baseband processor collects a communication parameter, and determines, based on the communication parameter, communication quality of a wireless link that is in a time period in which the feedback to a first data packet has timed out. The application processor determines a cause of a packet loss based on the communication quality of the wireless link. This is as follows:

collecting, by the baseband processor, a communication parameter of the wireless link in a time period in which the feedback information of the first data packet has timed out, and determining, based on the communication parameter, communication quality of the wireless link that is in the time in which the feedback information has timed out, and reporting the communication quality, where the time period of the timeout is a time period from sending the first data packet to the timeout of feedback information to the first data packet; determining, by the application processor, a cause of the timeout of the feedback information of the first data packet based on the reported communication quality of the wireless link when detecting that the return times of the feedback information of the plurality of subsequent data packets after the first data packet meet the preset return time requirement, where the timeout of the feedback information of the first data packet is caused by the packet loss on the wireless link or by the packet loss on the wired link.

Likewise, a process in which the baseband processor reports communication quality may include but is not limited to the following several implementations. 1 The application processor sends a first request to the baseband processor when detecting that the return times of the feedback information of the plurality of subsequent data packets after the first data packet meet the preset return time requirement, and the first request instructs the baseband processor to report communication quality. When receiving the first request, the baseband processor reports the communication quality to the application processor. 2. The baseband processor is provided with a reporting switch. When the reporting switch is in an on state, the baseband processor reports the communication quality to the application processor.

In one embodiment, a process of determining, based on the communication parameter, a cause of the timeout includes but is not limited to the following manners.

First, the foregoing communication parameter may include at least one of RSRP, RSRQ, an SINR, and an RLC retransmission rate.

First. A threshold range is preset for each communication parameter. When collecting the communication parameter of the wireless link, the baseband processor first determines whether each communication parameter exceeds the preset threshold range of the communication parameter. When there is no communication parameter exceeding the corresponding preset threshold range, the time outpacket loss is caused by the wired packet loss. However, when any of the communication parameters exceeds the corresponding threshold range, a score of the wireless link is calculated. When the score is lower than a preset score value, it is considered that the timeout is caused by the wireless packet loss; otherwise, it is considered that the timeout is caused by the wired packet loss. Alternatively, when collecting the foregoing communication parameter, the baseband processor reports the communication parameter to the application processor. The application processor sets a threshold range for each communication parameter. When all of the communication parameters are within the preset threshold ranges, it is considered that the timeout is caused by the wired packet loss. When any of the communication parameters exceeds the corresponding threshold range, and a score that is of the wireless link and that is calculated based on the communication parameter is less than a preset score value, the timeout is caused by the wireless packet loss; otherwise, it is considered that the timeout is caused by the wired packet loss.

For example, in a 3G or an LTE network, the RSRQ and the RSRP are usually of negative values. Herein, a preset threshold range of (−10 dB, −30 dB) may be set for the RSRQ. If the collected RSRQ is −20 dB, it may be considered that the currently collected RSRQ is within the preset threshold range. If the collected RSRQ is −50 dB, it may be considered that the currently collected RSRQ exceeds the preset threshold range.

For another example, a weight may be preset for each communication parameter, and a score of the communication quality may be calculated based on the weight of each communication parameter and value of the collected communication parameter. For example, a weight set for the RSRP is 0.3, a weight set for the RSRQ is 0.2, a weight set for the SINR is 0.2, and a weight set for the RLC retransmission rate is 0.3. When the currently collected RSRP is −20 dB, the RSRQ is −30 dB, the SINR is 30 dB, and the RLC retransmission rate is 20%, the quality score of the entire wireless link is $\{0.3*|-20|+0.2*|-30|+0.2*30+0.3*(100-20)\}=42$.

For another example, a preset score is 60, and the score that is of the wireless link and that is calculated by the foregoing method is lower than 60, it may be considered that the communication quality of the wireless link that is in the time period in which the feedback information has timed out does not meet the requirement, and the timeout is caused by the wireless packet loss. If the score is higher than 60, it may be considered that the communication quality of the wireless link that is in the time period in which the feedback information has timed out meets the requirement, and the timeout is caused by the wired packet loss. The calculated quality score of the wireless link that is calculated by using an example is 42 and is lower than 60, and it may be considered that the timeout of feedback is caused by the wireless packet loss.

Second. When collecting a communication parameter of the wireless link in a time period in which the feedback information has timed out, the baseband processor directly calculates a score of the communication quality by using a wireless parameter. When the score is lower than a preset score value, the communication quality of the wireless link is poor, and the timeout is caused by the wireless packet loss. Otherwise, the communication quality of the wireless link is good, and the timeout is caused by the wired packet loss.

During actual application, when a group of communication parameters are collected, if communication quality corresponding to the communication parameters is calculated immediately, power consumption of the terminal is higher. Therefore, compared with the first manner, the threshold range is calculated first. When the threshold range is exceeded, the communication quality is calculated based on the communication parameter. In this way, a calculation amount of the terminal can be reduced, and therefore power consumption of the terminal is reduced.

It should be noted that, during actual application, there is an extremely low probability that the wireless link and the wired link are in trouble at the same time, and therefore in this application, when the feedback information has timed out, and the wireless link in the time period in which the feedback information has timed out does not meet the requirement, it can be determined that the wireless link is in trouble in this case. In addition, even though the wireless link and the wired link are in trouble at the same time, in this case, a value of the cwnd is usually not large, and in this solution, the cwnd is compensated for after the entire link becomes smooth. Therefore, the wired link is not congested again.

It should further be noted that, the technical solutions provided in this application can be typically applied to a wireless communications system, for example, a global system for mobile communications (GSM) network, a Code Division Multiple Access (CDMA) network, a Time Division-Synchronous Code Division Multiple Access (TD-SCDMA) network, a Wideband Code Division Multiple Access (WCDMA) network, a general packet radio service (GPRS) network, a Long Term Evolution (LTE) network, software-defined networking (SDN), or a wireless sensor network (WSN).

Figure 3:
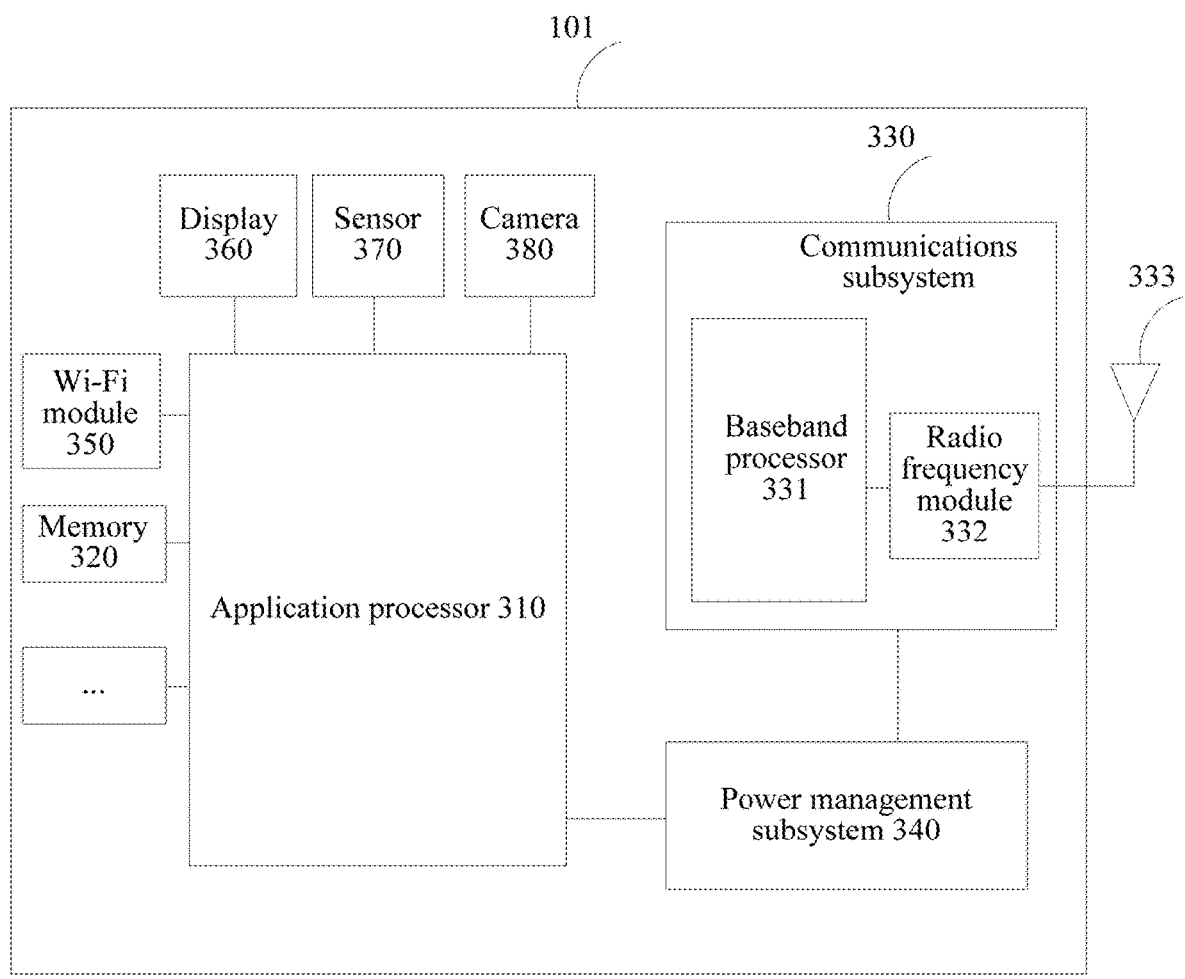
FIG. 3 is a schematic structural diagram of hardware of a terminal according to one embodiment.

In an example of this application, FIG. 3 shows a hardware structure of the terminal 101. As shown in FIG. 3, the terminal 101 may include an application processor 310, a memory 320, a communications subsystem 330, and a power management subsystem 340.

The memory 320 is configured to store an executable program. The executable program includes an operating system and an application program. The memory 320 usually includes an internal storage and an external storage. The internal storage may be a random access memory (RAM), a read-only memory (ROM), a cache, or the like. The external storage may be a hard disk drive, an optical disc, a USB flash drive, a floppy disk, a tape drive, or the like. The executable program is usually stored in an external storage, the application processor 310 loads the executable program from the external storage to the internal storage and then performs the program.

The application processor (AP) 310 is a processor configured to operate the operating system and the application program.

The communications subsystem 330 is mainly configured to implement a function such as baseband processing, modulation and demodulation, signal amplification and filtering, and balance. The communications subsystem 330 may include a baseband processor 331 (e.g., communication processor (CP)), and is referred to as a wireless modem, a radio frequency module 332, and an antenna 333.

The power management subsystem 340 is configured to supply power to the entire terminal.

It should be noted that, still referring to FIG. 3, the terminal 101 may further include a Wi-Fi (Wireless Fidelity) module 350, a display 360, a sensor 370, and a camera 380.

The Wi-Fi module 350 supports IEEE 802.11-series protocols, and the terminal 101 may access a WLAN by using the Wi-Fi module 350.

The display 360 is configured to display information entered by a user or information provided to a user and various menu interfaces of the terminal 101, or the like. The display 360 may be a liquid crystal display (e.g., light emitting diode (LED)), an organic light-emitting diode (OLED), or the like. In some embodiments, a touch panel may cover the display 360, to form a touch display.

The sensor 370 may be one or more of a gravity sensor, an acceleration sensor, and an optical sensor.

The camera 380 may be configured to take a photo or record a video.

It should be noted that, during actual application, the baseband processor 331 and the Wi-Fi module 350 may be integrated into a same chip, and the baseband processor 331 and the application processor 310 may also be integrated into a same chip, or may separately be an independent chip. FIG. 3 is merely an example of expression. People skilled in the art may understand that the terminal 101 may include more or fewer components than those shown in FIG. 3, and the terminal 101 shown in FIG. 3 merely shows components that are more relevant to the plurality of implementations disclosed in the embodiments of this application.

It should be noted that, the terminal shown in FIG. 3 may be configured to perform the method described in the embodiments of this application.

The following continuous to describe software and hardware environments of the terminal 101. The terminal 101 may be divided, based on logical layers, into a hardware layer, an operating system, and an application layer (also referred to as a user mode) that operates on the operating system.

The hardware layer may include the hardware described in the embodiment shown in FIG. 3, for example, the application processor 310, the memory 320, and the Wi-Fi module 350. The operating system may be an Android® operating system, a Linux® operating system, a Windows operating system, an operating system of another type, and the like. This is not limited in this application.

In an embodiment, the operating system may include: a framework layer, a kernel mode, and a driver layer. The driver layer may include a driver of a hardware device, for example, a sensor driver, a Wi-Fi driver, and a display driver. The kernel mode includes a TCP protocol stack, an IP protocol stack, and the like. The framework layer may include an interface used for communication between a user layer and the kernel mode, and some services, for example, a graphic service, a system service, a web service, and a customer service. Applications are run at the application layer. Usually, the applications such as a graphics library, a media player, a browser, and WeChat may directly interact with a user by using the display. Application programs of both the operating system and the application layer may be stored in the memory 320 in a form of an executable program. The term of "program" used in the embodiments of the present invention may be broadly construed as including but not being limited to an instruction, an instruction set, code, a code segment, a subprogram, a software module, an application, a software package, a thread, a process, a function, firmware, middleware, and the like.

In this application, the terminal 101 may access a cellular network by using the communications subsystem 330, and then communicates with the remote server 105 in FIG. 1 by using a wide area network. Alternatively, the terminal 101 may access a WLAN by using a Wi-Fi module 350, and then communicates with the remote server 105 in FIG. 1 by using a wide area network.

Referring to FIG. 1, after accessing a network, the terminal 101 may establish a TCP connection with the remote server 105 by using a TCP/IP protocol stack (referring to the TCP protocol stack and the IP protocol stack), and then transmits data by using the TCP connection. The TCP/IP protocol stack is middleware configured to implement a TCP/IP protocol stack defined by a TCP/IP reference model. The TCP protocol stack may be executed by software, or an appropriate combination of hardware and firmware on the terminal 101. The TCP/IP protocol stack includes two core protocols: a TCP (Transmission Control Protocol) and an IP (Internet Protocol). The establishment of the TCP connection between the terminal 101 and the remote server 105 may be initiated by an application run on the terminal 101. For example, the browser in the terminal 101 is used as an example. The browser may generate a socket open (socket open) command. The command is transferred to the TCP protocol stack of the terminal 101, to trigger the TCP protocol stack to establish a TCP connection with the remote server 105 by performing three-way message exchange (also referred to as "three-way handshake"). Then, the TCP protocol stack notifies the browser that the connection is established. In this case, the browser and the remote server 105 in the terminal 101 may transmit a TCP data packet based on the established TCP connection.

Herein, how the terminal 101 sends a TCP data packet by using the application processor 310 and the baseband processor 331 is described in detail. This is as follows.

First, it should be noted that, in this application, the application processor 310 may be considered as a processor core, and the baseband processor 331 may be considered as another processor core. The software architecture may support a mechanism of data communication between the two cores. The communication between the two cores complies with a specific inter-core communication protocol. The embodiments of the present invention do not limit a type of the inter-core communication protocol.

Figure 4:
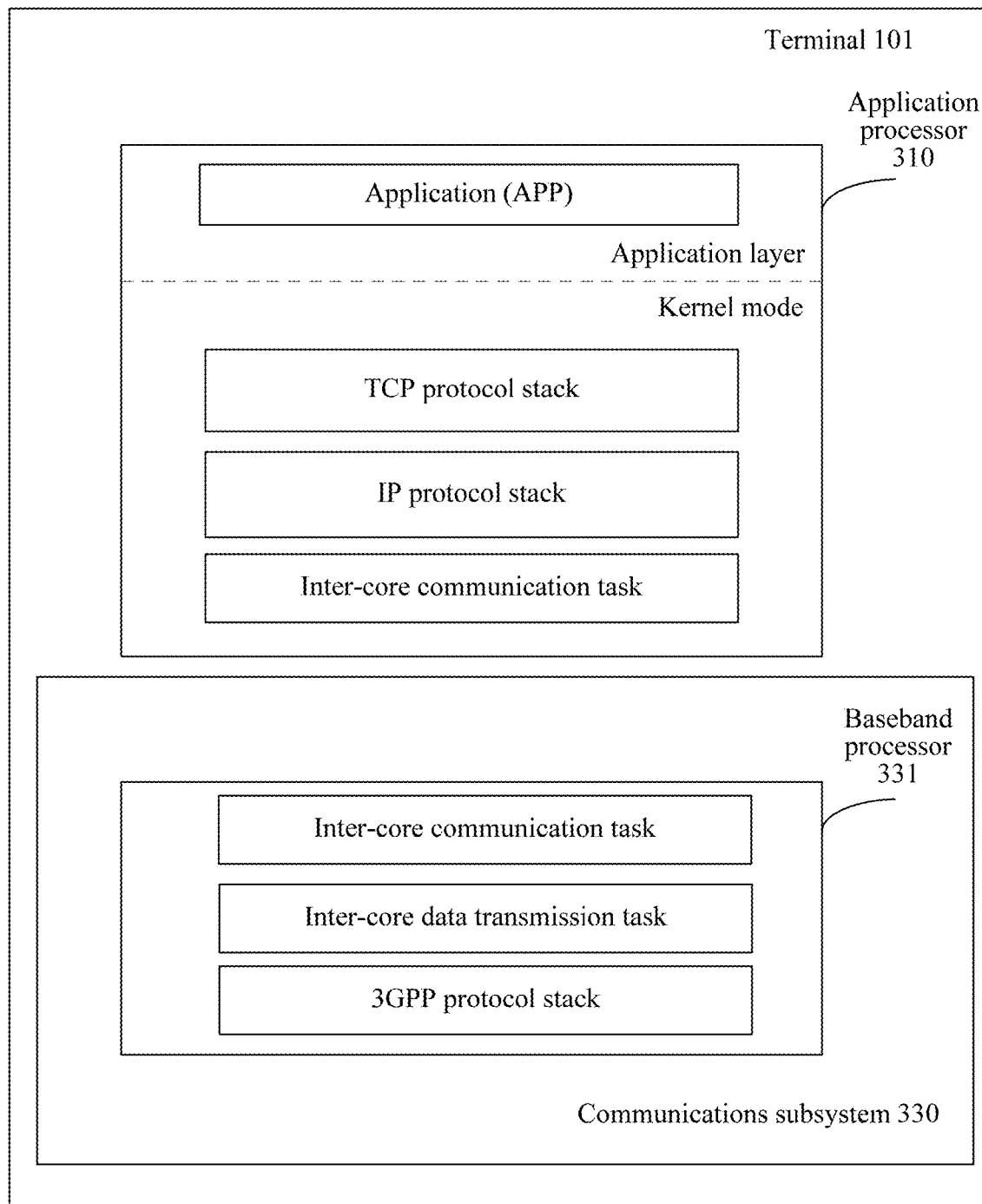
FIG. 4 is a framework diagram of software of an application processor and a baseband processor according to one embodiment.

Herein, as shown in FIG. 4, the application processor 310 may include an application layer and a kernel mode in an aspect of software, the application layer may include an application (APP), the kernel mode may include a TCP protocol stack, an IP protocol stack, and an inter-core communication task, and the baseband processor 331 may include an inter-core communication task, an inter-core data transmission task, and a 3GPP protocol stack.

Still referring to FIG. 4, the application processor 310 may first process, by using a socket interface at a source end of the TCP connection, a to-be-transmitted TCP data packet by using the TCP protocol stack and the IP protocol stack, and then sends the to-be-transmitted TCP data packet to the inter-core communication task of the baseband processor 331 by using the inter-core communication task of the kernel mode. The inter-core communication task may be understood as a task in a computing system, or may be understood as a thread. After receiving the to-be-transmitted TCP data packet, the inter-core communication task of the baseband processor 331 sends the to-be-transmitted TCP data packet to the 3GPP protocol stack by using the internal inter-core data transmission task. The 3GPP protocol stack then sends the to-be-transmitted TCP data packet by using the hardware of the communications subsystem 330 shown in FIG. 1. Herein, the 3GPP protocol stack is mainly configured to carry one or more types of communication protocols at a data link layer and a physical layer, and is mainly used for various communication protocols of a cellular network. The communication protocols include but are not limited to various communication protocols in 3G, 4G, or even future 5G, and for example, may be GSM, LTE, or CDMA.

Normally, after the terminal 101 sends a round of data packets in an RTT time period, the remote server 105 sends an ACK message to the terminal 101. In this application, if a packet loss is found due to a wireless link between the remote server 105 and the terminal 101, in preset feedback duration of the terminal, the ACK message cannot be received. In this case, the terminal 101 determines that the ACK message has timed out. In the prior art, a congestion control policy is started in the terminal 101. The congestion control policy is as follows. First, the cwnd is set to 1, the lost packet is retransmitted, and then a slow start process is performed.

However, herein, when detecting that the feedback information has timed out, in addition to starting the foregoing congestion control policy, the terminal 101 further sends a request to the baseband processor 331 to query a cause of the timeout of feedback, and continuously detects whether the RTT apparently decreases. Once the terminal 101 detects that the RTT apparently decreases, and that the timeout of feedback is caused by the wireless link, the cwnd is directly set to be the cwnd before the timeout of feedback or be twice the current cwnd.

The following describes, with reference to a software architecture of FIG. 3 and by using a terminal in an Android system as an example, how in an embodiment, the application processor and the baseband processor cooperate to adjust a cwnd of one connection on which the timeout of feedback occurs after the timeout of feedback. The application processor and the baseband processor may be two cores or may be two independent chips. For content that is of this embodiment and that is mentioned above, refer to the foregoing content. This is not described herein again.

In this embodiment, the baseband processor includes a 3GPP protocol stack, and a task used for transmitting a data packet with the application processor (briefly referred to as an inter-core data transmission task), and further includes an inter-core communication task used for a smaller quantity of to-be-transmitted data. The application processor includes another inter-core communication task that corresponds to the inter-core communication task in the baseband processor, a TCP protocol stack, an IP protocol stack (where the TCP protocol stack and the IP protocol stack are collectively referred to as a TCP/IP protocol stack below), and an application run at the application layer of the application processor.

Figure 5:
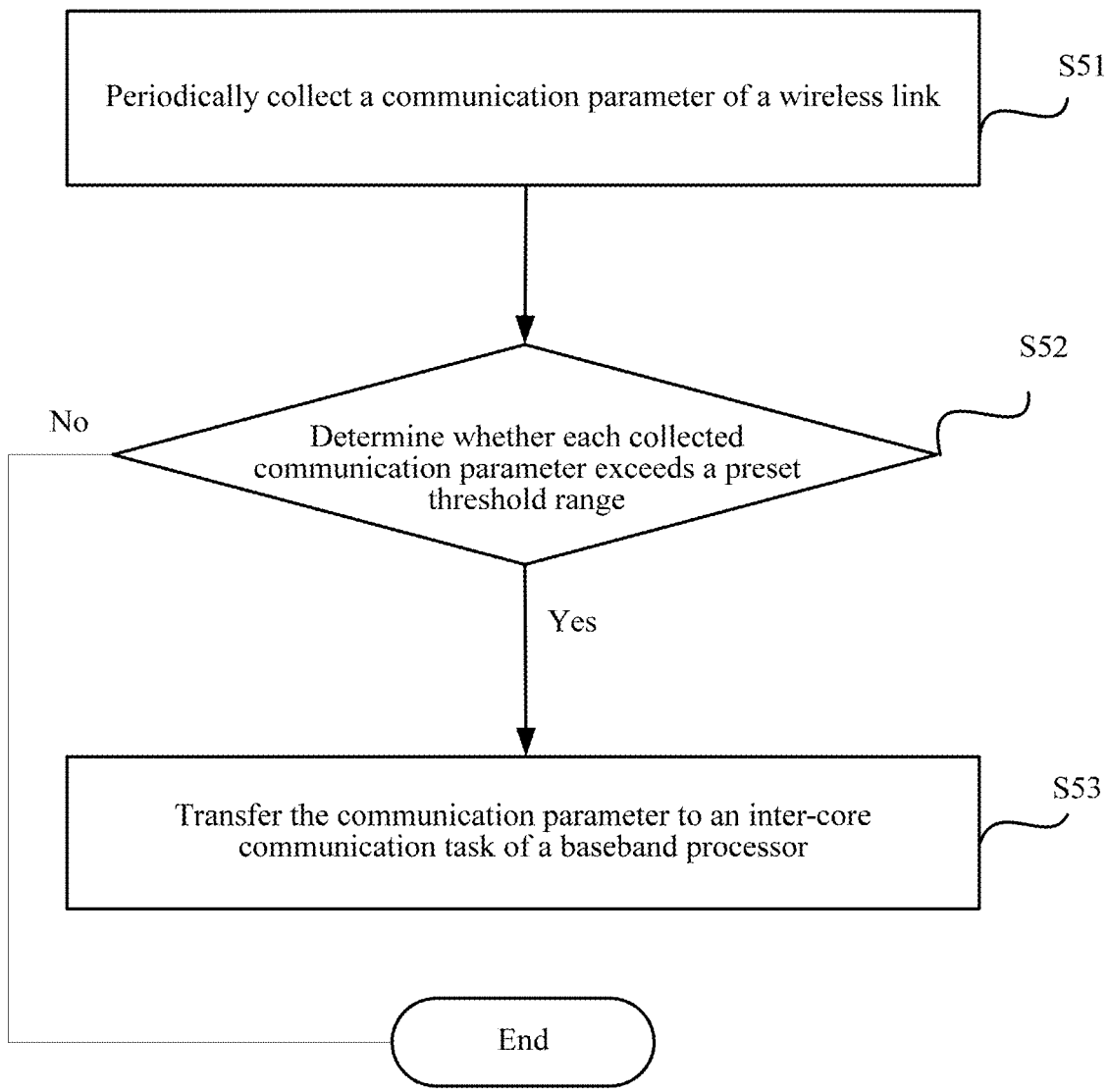
FIG. 5 shows a processing procedure of a 3GPP protocol stack of a baseband processor according to one embodiment.

Herein, for a processing process of the 3GPP protocol stack of the baseband processor, refer to FIG. 5. It should be noted that, FIG. 5 is merely for ease of understanding and cannot limit steps of this application.

Step S51: Periodically collect a communication parameter of a wireless link, for example, one or more of RSRP, RSRQ, an SINR, and an RLC retransmission rate.

Step S52: Determine whether each collected communication parameter exceeds each preset threshold range; and if each collected communication parameter exceeds each preset threshold range, perform step S53; otherwise, end the procedure.

Step S53: Transfer the communication parameter to the inter-core communication task of the baseband processor, for example, transfer the information by sharing an internal storage.

It should be noted that, the communication parameter reported by the 3GPP protocol stack of the baseband processor may carry a time stamp corresponding to the communication parameter. The time stamp is usually a character sequence and may uniquely identify a time of a moment.

Figure 6:
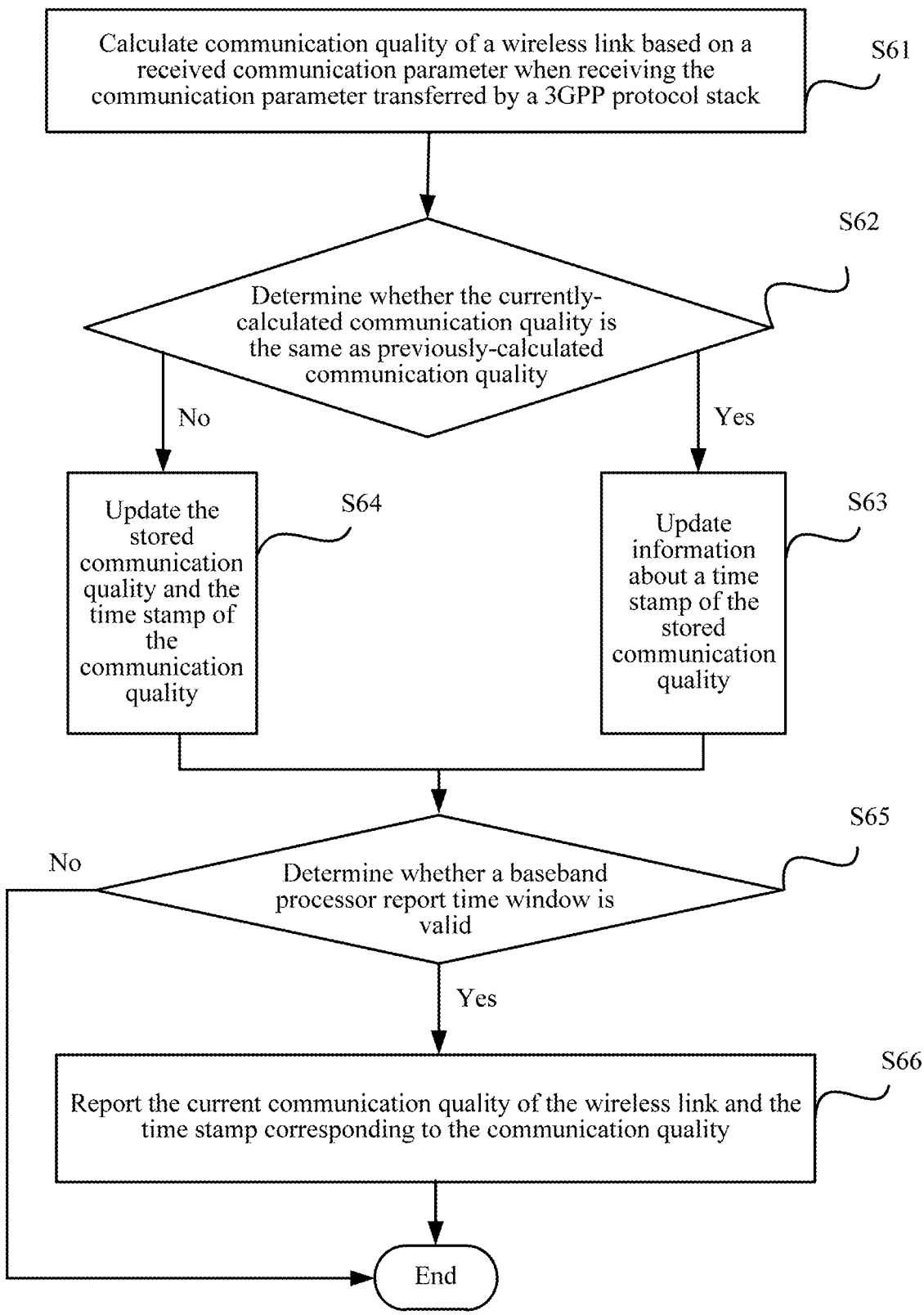
FIG. 6 shows a processing procedure of an inter-core communication task of a baseband processor according to one embodiment.

Herein, for a processing process of the inter-core communication task of the baseband processor, refer to FIG. 6. It should be noted that, FIG. 6 is merely for ease of understanding and cannot limit steps of this application.

Step S61: Calculate communication quality of the wireless link based on the received communication parameter when receiving the communication parameter transferred by the 3GPP protocol stack.

Herein, there may be a quantity of manners for calculating the communication quality based on the communication parameter. This is not limited in this application. For an implementation of this application, specifically refer to the descriptions in the foregoing embodiment. This is not described herein again.

Step S62: Determine whether the currently-calculated communication quality is the same as previously-calculated communication quality; and if the currently-calculated communication quality is the same as the previously-calculated communication quality, perform step S63; otherwise, perform step S64.

Herein, the previously-calculated communication quality is calculated based on a previous communication parameter.

Step S63: Update information about a time stamp of the stored communication quality.

Step S64: Update the stored communication quality and the time stamp of the communication quality. In this application, a storage unit may be allocated, and the storage unit is configured to store the communication quality of the wireless link and the time stamp of the communication quality. When the currently-determined communication quality is the same as the previously-determined communication quality, only the information about the time stamp of the stored communication quality needs to be updated. When the current communication quality of the wireless link is not the same as the previously-determined communication quality of the wireless link, the stored communication quality and the time stamp of the communication quality are updated.

Step S65: Determine whether a Modem report time window is valid; and if the Modem report time window is valid, perform step S66; otherwise, end the procedure.

Herein, a modem switch is provided in the inter-core communication task of the baseband processor. When the modem switch is turned on, a modem report time window is provided. In a validity period of the report time window, the inter-core communication task of the baseband processor continuously reports the communication quality that is of the wireless link and that is stored in the storage unit and the corresponding time stamp to the inter-core communication task of the application processor. Once the Modem report time window is invalidated, the inter-core communication task of the baseband processor no longer reports the stored communication quality of the wireless link and the information about the corresponding time stamp, and turns off the modem switch. The validity period of the modem report time window may be preset duration of valid reporting. For example, when the Modem switch is turned on, the modem switch may continuously report the stored communication quality of the wireless link in 5s, and the 5s may be the validity period of the report time window.

It should be noted that, in this application, the modem switch of the baseband processor is usually always-turned-off, and reports the communication quality of the wireless link only after receiving a request of the inter-core communication task of the application processor.

Step S66: Report the current communication quality of the wireless link and the time stamp corresponding to the communication quality.

It can be learned that, the inter-core communication task of the baseband processor uses a policy of a combination of passive triggering and time-limited active reporting, so that communication overheads between the application processor and the baseband processor can be minimized, the application processor is prevented from being frequently woken up when messages are reported, and the baseband processor is prevented from being collapsed due to frequent receiving of messages by the application processor.

Figure 7:
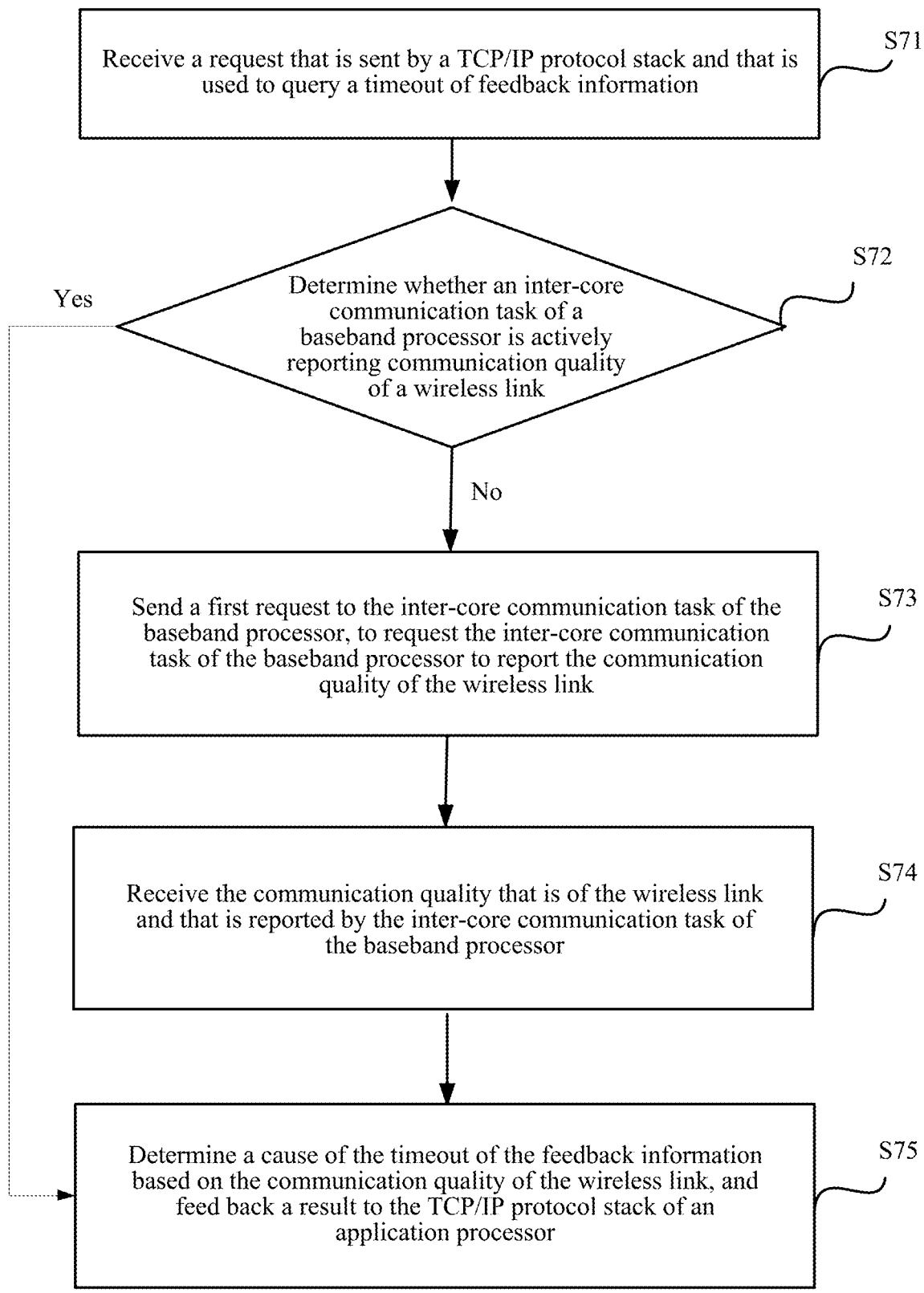
FIG. 7 shows a processing procedure of an inter-core communication task of an application processor according to one embodiment.

In this application, for a processing process of the inter-core communication task of the application processor, refer to FIG. 7. It should be noted that, FIG. 5 is merely for ease of understanding and cannot limit steps of this application.

Step S71: Receive a request that is sent by the TCP/IP protocol stack and that is used to query a timeout of the feedback information.

Step S72: Determine whether the inter-core communication task of the baseband processor is actively reporting the communication quality of the wireless link; and if the inter-core communication task of the baseband processor is not actively reporting the communication quality of the wireless link, perform step S73; otherwise, perform step S75.

Step S73: Send a first request to the inter-core communication task of the baseband processor, to request the inter-core communication task of the baseband processor to report the communication quality of the wireless link.

In this application, when receiving the request, the inter-core communication task of the baseband processor turns on the Modem switch, and reports the stored communication quality of the wireless link to the inter-core communication task of the application processor.

Step S74: Receive the communication quality that is of the wireless link and that is reported by the inter-core communication task of the baseband processor.

Step S75: Determine a cause of the timeout of the feedback information based on the communication quality of the wireless link, and feed back a result to the TCP/IP protocol stack of the application processor.

Figure 8:
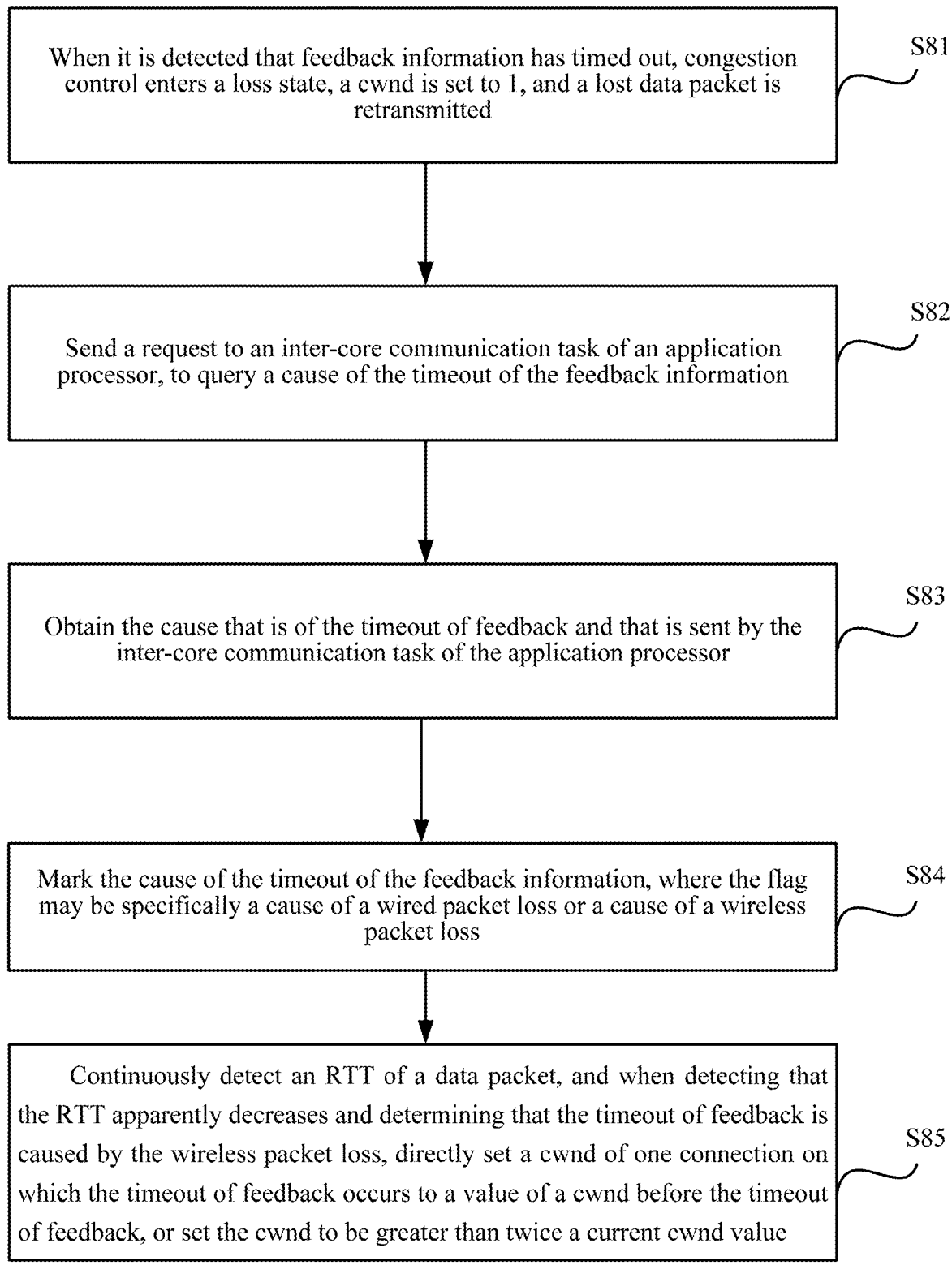
FIG. 8 shows a processing procedure of a TCP/IP protocol stack of an application processor according to one embodiment.

Herein, for a processing process of the TCP/IP protocol stack of the application processor, refer to FIG. 8. It should be noted that, FIG. 8 is merely for ease of understanding and cannot limit steps of this application.

Step S81: When it is detected that the feedback information has timed out, congestion control enters a loss state, the cwnd is set to 1, and a lost data packet is retransmitted.

Step S82: Send a request to the inter-core communication task of the application processor, to query a cause of the timeout of the feedback information.

Step S83: Obtain the cause that is of the timeout of feedback and that is sent by the inter-core communication task of the application processor.

Step S84: Mark the cause of the timeout of the feedback information, where the flag may be a cause of a wired packet loss or a cause of a wireless packet loss.

Step S85: Continuously detect an RTT of a data packet, and when detecting that the RTT apparently decreases and determining that the timeout of feedback is caused by the wireless packet loss, directly set a cwnd of one connection on which the timeout of feedback occurs to a value of a cwnd before the timeout of feedback, or set the cwnd to be greater than twice a current cwnd value.

Figure 9:
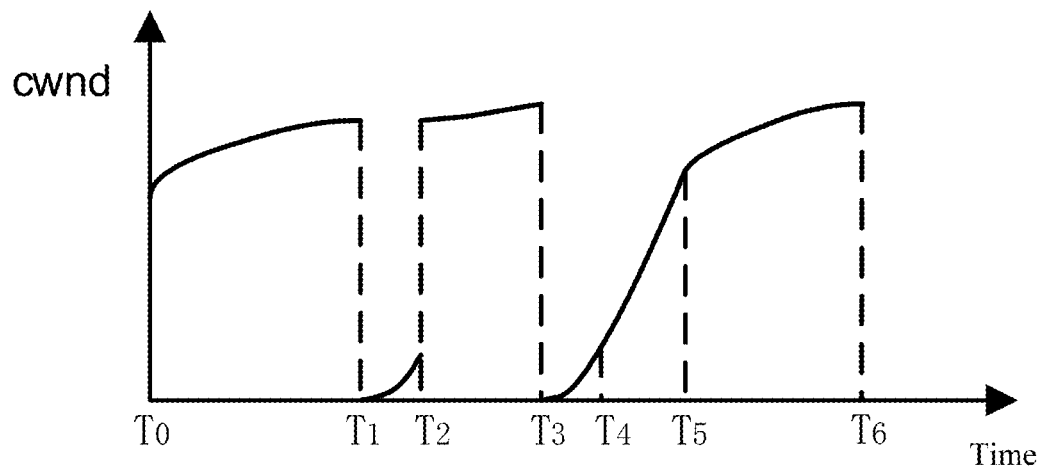
FIG. 9 is a schematic diagram of a congestion window according to this application.

The following describes an embodiment with reference to a timing diagram shown in FIG. 9 that indicates a congestion window change.

T0-T1 shown in FIG. 9 is a congestion avoidance phase in which a cwnd slowly increases, and an increasing speed of the cwnd is related to a specific algorithm. This is not described herein again. It is assumed that the feedback information has timed out at the T1 moment, based on an existing TCP congestion control algorithm, the cwnd backs off to 1 at the T1 moment, and enters a slow start phase. In the slow start process, the cwnd exponentially increases and is doubled when every time an RTT window is passed.

In this case, the TCP/IP protocol stack of the application processor sends a request for querying a cause of the timeout of feedback to a data packet to the inter-core communication task of the application processor, and continuously detects the RTT. It is assumed that at the T2 moment, it is detected that the RTT apparently decreases and is returned due to the wireless link, the cwnd is set to Max. Max may be a larger value of a cwnd value before the feedback information has timed out and a current cwnd value. In FIG. 9, because the cwnd before the feedback information has timed out is apparently greater than the cwnd at the T2 moment, the cwnd quickly recovers to the value before the timeout, and then a congestion avoidance phase (T2-T3) is entered. It is assumed that the feedback information has timed out again at the T3 moment, the cwnd backs off to 1 and enters a slow start phase, a cause of returning at the T4 moment is that the wired link is congested or that there is no trend that the RTT apparently decreases, and the cwnd remains unchanged at the T4 moment and the slow start process is continuously performed until the congestion avoidance phase is entered at the T5 moment. A cwnd value at the T5 moment is related to a specific TCP algorithm, and may be half of the cwnd value before the timeout or may be 70% of the cwnd value before the timeout. The cwnd slowly increases after the T5 moment, and recovers to the cwnd before the timeout until the T6 moment. Comparing the cwnd recovery processes after the two times of backoff of the timeouts in FIG. 9, it can be learned that this solution can improve a cwnd recovery speed when the wireless packet loss occurs, thereby improving an uplink transmission throughput rate in a mobile high packet loss scenario.

It should be noted that, in a weak field and a high-speed movement scenario (for example, a metro, a train, or a bullet train), the timeout of the feedback information caused by the wireless link occurs at a very high frequency, and therefore, by using the method in this application, the uplink throughputs of the weak field and the high-speed movement scenario are more effectively improved. Related tests indicate that in the weak field and the high-speed movement scenario, the uplink transmission throughput can be improved by 10% to 20% by using the method in this application.

Figure 10:
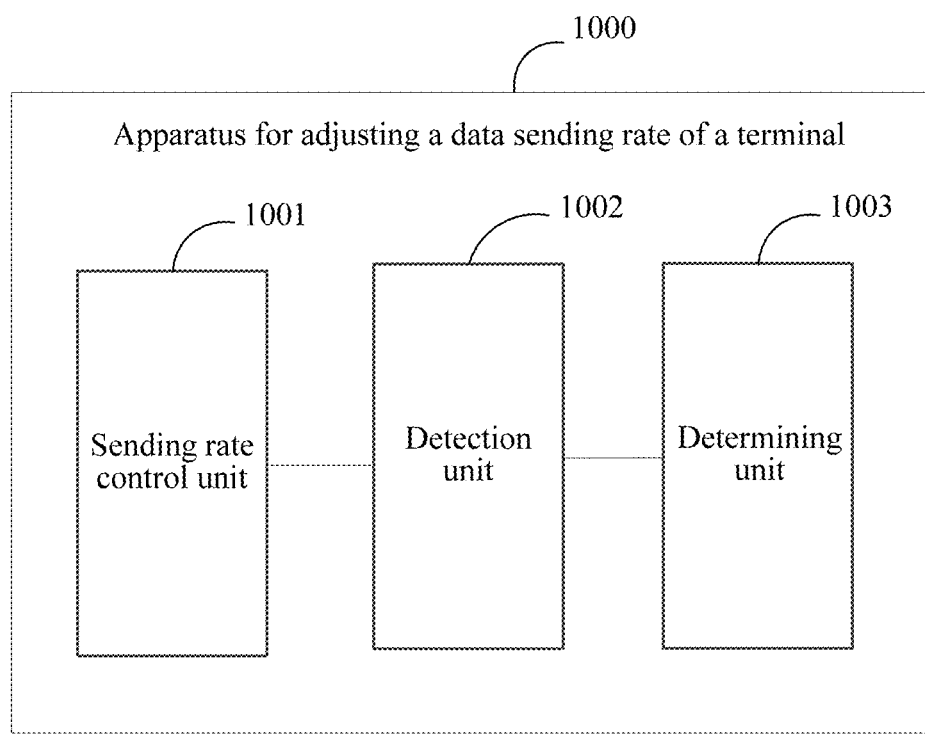
FIG. 10 is a schematic structural diagram of an apparatus for adjusting a data sending rate of a terminal according to one embodiment.

Based on a same concept, this application further provides an apparatus for adjusting a data sending rate of a terminal. As shown in FIG. 10, the apparatus 1000 includes:

a sending rate control unit 1001 configured to reduce, when determining that return of feedback information of a first data packet has timed out, a data sending rate of a connection to which the first data packet belongs from a first value to a second value, where the first data packet is a data packet sent by the apparatus to a target device over a communications link, and the communications link includes a wireless link and a wired link;

a detection unit 1002 configured to detect return times of feedback information of a plurality of subsequent data packets after the first data packet; and a determining unit 1003 configured to determine a cause of the timeout of the feedback information of the first data packet when detecting that the return times of the feedback information of the plurality of subsequent data packets after the first data packet meet a preset return time requirement; where the sending rate control unit 1001 is further configured to increase a data sending rate of the terminal from a current third value to a fourth value when determining that the timeout is caused by a packet loss on the wireless link in the communications link, where the third value is greater than or equal to the second value and is less than the first value.

In one embodiment, the fourth value is greater than or equal to the first value, or the fourth value is greater than twice the third value.

In one embodiment, the return time of the feedback information is a round trip time RTT of a data packet corresponding to the feedback information, and that the return of the feedback information of the first data packet has timed out indicates that an RTT of the first data packet has timed out; and the data sending rate of the apparatus is a congestion window cwnd of the connection to which the first data packet belongs.

In one embodiment, the determining unit 1003 includes a first determining unit and a second determining unit. The first determining unit is configured to collect a communication parameter of the wireless link in a time period in which the feedback information of the first data packet has timed out, where the time period of the timeout is a time period from sending the first data packet to the timeout of feedback information to the first data packet. The second determining unit is configured to: obtain the communication parameter of the wireless link when detecting that the return times of the feedback information of the plurality of subsequent data packets after the first data packet meet the preset return time requirement; and determine a cause of the timeout of the feedback information of the first data packet based on the communication parameter of the wireless link, where the timeout of the feedback information of the first data packet is caused by the packet loss on the wireless link or a packet loss on the wired link.

In one embodiment, when obtaining the communication parameter of the wireless link when detecting that the return times of the feedback information of the plurality of subsequent data packets after the first data packet meet the preset return time requirement, the second determining unit is configured to:

send a first request to the first determining unit when detecting that the return times of the feedback information of the plurality of subsequent data packets after the first data packet meet the preset return time requirement, where the first request instructs the first determining unit to report the communication parameter of the wireless link; and receive the communication parameter of the wireless link, where the communication parameter is sent by the first determining unit to the second determining unit according to the first request.

In one embodiment, when obtaining the communication parameter of the wireless link when detecting that the return times of the feedback information of the plurality of subsequent data packets after the first data packet meet the preset return time requirement, the second determining unit is configured to: receive a plurality of communication parameters, where the plurality of communication parameters are reported by the first determining unit to the second determining unit when a reporting switch is in an on state; and select, when detecting that the return times of the feedback information of the plurality of subsequent data packets after the first data packet meet the preset return time requirement, a communication parameter that is in the time period in which feedback information has timed out from the plurality of communication parameters.

In one embodiment, the determining unit 1003 includes a second determining unit and a first determining unit. The first determining unit is configured to: collect a communication parameter of the wireless link in a time period in which the feedback information of the first data packet has timed out; and determine, based on the communication parameter, communication quality of the wireless link that is in the time in which the feedback information has timed out, where the time period of the timeout is a time period from sending the first data packet to the timeout of feedback information to the first data packet. The second determining unit is configured to: determine, when detecting that the return times of the feedback information of the plurality of subsequent data packets after the first data packet meet a preset return time requirement, a cause of the timeout of the feedback information of the first data packet based on the communication quality of the wireless link, where the timeout of the feedback information of the first data packet is caused by the packet loss on the wireless link or by the packet loss on the wired link.

In one embodiment, the determining unit 1003 includes a second determining unit and a first determining unit. The first determining unit is configured to: collect a communication parameter of the wireless link in a time period in which the feedback information of the first data packet has timed out; and determine a cause of the timeout of feedback information to the first data packet based on the communication parameter, where the timeout of the feedback information of the first data packet is caused by the packet loss on the wireless link or by the packet loss on the wired link. The second determining unit is configured to obtain the cause of the timeout of feedback information to the first data packet when detecting that the return times of the feedback information of the plurality of subsequent data packets after the first data packet meet the preset return time requirement.

In one embodiment, the communication parameter includes at least one of reference signal received power, reference signal received quality, a signal-to-noise ratio, and a wireless link retransmission rate.

In one embodiment, a principle of resolving a problem by the apparatus provided in the foregoing embodiment of this application is similar to a principle of resolving a problem by the method embodiment provided in the foregoing embodiment of this application. Therefore, mutual reference may be made to a specific implementation and a beneficial effect of the apparatus provided in the foregoing embodiment of this application and an implementation and a beneficial effect of the method provided in the foregoing embodiment of this application. Repetitions are not described again.

Division of the modules in the embodiments of this application is only an example, and is merely logical function division. There may be other division manners during actual implementation. In addition, the functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 11:
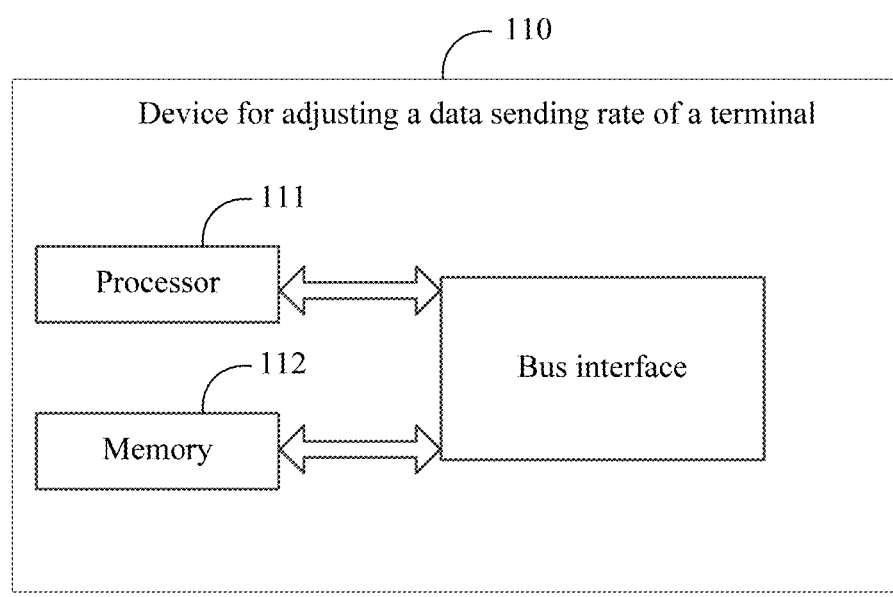
FIG. 11 is a schematic structural diagram of a device for adjusting a data sending rate of a terminal according to one embodiment.

As shown in FIG. 11, this application further provides a device 110 for adjusting a data sending rate of a terminal, including a processor 111. The processor 111 may be a central processing unit (CPU), may be a digital processing unit, or the like. The processor 111 is configured to perform the method for adjusting a data sending rate of a terminal provided in the foregoing embodiment.

The device 110 may further include a memory 112, configured to store a computer-executable instruction. The memory may be a nonvolatile memory such as a hard disk (HDD) or a solid-state drive (SSD), or may be a volatile memory, for example, a random-access memory (RAM). The memory is any other medium that can carry or store expected program code in a form of an instruction or a data structure and can be accessed by a computer, but is not limited thereto.

Although not shown in the figure, the device 110 may further include a communications interface, configured to communicate with an external device.

In this embodiment, a specific connection medium between the processor 111 and the memory 112 is not limited. In this embodiment, in FIG. 11, the processor 111 is connected to the memory 112 by using a bus. The bus is indicated by using a hollow line with a double-headed arrow in FIG. 11, but it does not indicate that there is only one bus or one type of bus. A connection manner of other components is merely described by using an example, and is not limited thereto. The bus may be classified into an address bus, a data bus, a control bus, and the like. It should be noted that, the device 110 may be the terminal shown in FIG. 3 or FIG. 4, and may perform the method for adjusting a data sending rate of a terminal shown in FIG. 2. For example, the device shown in FIG. 11 may be a specific implementation of the apparatus shown in FIG. 10. An embodiment of the sending rate control unit 1001, the detection unit 1002, and the determining unit 1003 shown in FIG. 10 is invoking a computer executable instruction in the memory 112 by using the processor 111 shown in FIG. 11.

This application further provides a computer-readable storage medium, including an instruction. The instruction, when run on a computer, enables the computer to perform the foregoing method for adjusting a terminal sending rate.

Based on a same concept, an embodiment of this application further provides a chip. The chip establishes a data connection to a network device by using a baseband chip, and the chip includes an application processing unit and a communications interface. The application processing unit is configured to: reduce, when determining that return of feedback information of a first data packet has timed out, a data sending rate of a connection to which the first data packet belongs from a first value to a second value, where the first data packet is a data packet sent by the application chip to a target device over a communications link, and the communications link includes a wireless link and a wired link; detect return times of feedback information of a plurality of subsequent data packets after the first data packet; receive, when detecting that the return times of the feedback information of the plurality of subsequent data packets after the first data packet meet a preset return time requirement, a reported parameter from the baseband chip by using the communications interface, where the reported parameter is a communication parameter of the wireless link, the reported parameter is a cause of a timeout of feedback, or the reported parameter is communication quality of the wireless link, and the communication quality of the wireless link is a value used to indicate that the wireless link meets a preset communication requirement or that the wireless link does not meet a preset communication requirement; determine the cause of the timeout of the feedback information of the first data packet based on the reported parameter; and increase a data sending rate from a current third value to a fourth value when determining that the timeout is caused by a packet loss on the wireless link in the communications link, where the third value is greater than or equal to the second value and is less than the first value.

In one embodiment, the fourth value is greater than or equal to the first value, or the fourth value is greater than twice the third value.

In one embodiment, the return time of the feedback information is a round trip time RTT of a data packet corresponding to the feedback information, and that the return of the feedback information of the first data packet has timed out indicates that an RTT of the first data packet has timed out; and the data sending rate is a congestion window cwnd of the connection to which the first data packet belongs.

In one embodiment, the reported parameter is a communication parameter of the wireless link. The receiving, by the application processing unit when detecting that the return times of the feedback information of the plurality of subsequent data packets after the first data packet meet the preset return time requirement, the reported parameter from the baseband chip by using the communications interface includes: receiving, by the application processing unit when detecting that the return times of the feedback information of the plurality of subsequent data packets after the first data packet meet the preset return time requirement, the communication parameter from the baseband chip by using the communications interface. The determining, by the application processing unit, the cause of the timeout of the feedback information of the first data packet based on the reported parameter includes: determining, by the application processing unit, the cause of the timeout of the feedback information of the first data packet based on the communication parameter of the wireless link, where the timeout of the feedback information of the first data packet is caused by the packet loss on the wireless link or a packet loss on the wired link.

In one embodiment, the receiving, by the application processing unit when detecting that the return times of the feedback information of the plurality of subsequent data packets after the first data packet meet the preset return time requirement, the communication parameter from the baseband chip by using the communications interface includes: sending, by the application processing unit when detecting that the return times of the feedback information of the plurality of subsequent data packets after the first data packet meet the preset return time requirement, a first request to the baseband chip by using the communications interface, where the first request instructs the baseband chip to report the communication parameter of the wireless link; and receiving, by the application processing unit, the communication parameter that is of the wireless link and that is sent by the baseband chip.

In one embodiment, the obtaining, by the application processing unit, the communication parameter of the wireless link when detecting that the return times of the feedback information of the plurality of subsequent data packets after the first data packet meet the preset return time requirement includes:

receiving, by the application processing unit, a plurality of communication parameters reported by the baseband chip; and selecting, by the application processing unit when detecting that the return times of the feedback information of the plurality of subsequent data packets after the first data packet meet the preset return time requirement, a communication parameter that is in a time period in which the feedback information has timed out from the plurality of communication parameters.

In one embodiment, the reported parameter is the communication quality of the wireless link. The receiving, by the application processing unit when detecting that the return times of the feedback information of the plurality of subsequent data packets after the first data packet meet the preset return time requirement, the reported parameter from the baseband chip by using the communications interface includes: receiving, by the application processing unit when detecting that the return times of the feedback information of the plurality of subsequent data packets after the first data packet meet the preset return time requirement, the communication quality of the wireless link from the baseband chip by using the communications interface. The determining, by the application processing unit, the cause of the timeout of the feedback information of the first data packet based on the reported parameter includes: determining, by the application processing unit, the cause of the timeout of the feedback information of the first data packet based on the communication quality of the wireless link, where the timeout of the feedback information of the first data packet is caused by the packet loss on the wireless link or a packet loss on the wired link.

In one embodiment, the reported parameter is the cause of the timeout of feedback. The receiving, by the application processing unit when detecting that the return times of the feedback information of the plurality of subsequent data packets after the first data packet meet the preset return time requirement, the reported parameter from the baseband chip by using the communications interface includes: receiving, by the application processing unit when detecting that the return times of the feedback information of the plurality of subsequent data packets after the first data packet meet the preset return time requirement, the cause of the timeout of feedback from the baseband chip by using the communications interface, where the timeout of the feedback information of the first data packet is caused by the packet loss on the wireless link or by the packet loss on the wired link. The determining, by the application processing unit, the cause of the timeout of the feedback information of the first data packet based on the reported parameter includes: using, by the application processing unit, the received cause of the timeout of the feedback information of the first data packet is a cause of the timeout of the feedback information of the first data packet.

In one embodiment, the communication parameter includes at least one of reference signal received power, reference signal received quality, a signal-to-noise ratio, and a wireless link retransmission rate.

It should be noted that, the chip in this embodiment of this application may specifically implement functions of the application processor in all the foregoing embodiments.

An embodiment of this application further provides a chip. The chip includes a baseband processing unit and a communications interface. The baseband processing unit is configured to: determine a reported parameter; send the reported parameter to an application chip by using the communications interface, so that the application chip adjusts, based on the reported parameter, a rate of sending data to a target device; and send to-be-sent data that is of the communications link and that is received from the application chip to the target device, where the communications link between the chip and the target device includes a wired link and a wireless link, the reported parameter is any one of the following parameters: a communication parameter of the wireless link, a cause of a timeout of return times of feedback information in the communications link, or communication quality of the wireless link, where the communication quality of the wireless link is a value used to indicate that the wireless link meets a preset communication requirement or that the wireless link does not meet a preset communication requirement.

In one embodiment, the reported parameter is the communication quality of the wireless link. The determining, by the baseband processing unit, a reported parameter includes: collecting, by the baseband processing unit, the communication parameter of the wireless link.

In one embodiment, the reported parameter is a cause of the timeout of feedback of the wireless link. The determining, by the baseband processing unit, a reported parameter includes: collecting, by the baseband processing unit, the communication parameter of the wireless link; and determining, by the baseband processing unit, the cause of the timeout of feedback based on the communication parameter of the wireless link, where the timeout of feedback is caused by a packet loss on the wireless link or a packet loss on the wired link.

In one embodiment, the reported parameter is the communication quality of the wireless link. The determining, by the baseband processing unit, a reported parameter includes: collecting, by the baseband processing unit, the communication parameter of the wireless link; and determining, by the baseband processing unit, the communication quality of the wireless link based on the communication parameter of the wireless link.

In one embodiment, the communication parameter includes at least one of reference signal received power, reference signal received quality, a signal-to-noise ratio, and a wireless link retransmission rate.

It should be noted that, the chip in this embodiment may implement functions of the baseband processor in all the foregoing embodiments.

An embodiment of this application further provides another chip. The chip includes an application processing unit and a baseband processing unit. The application processing unit is configured to: reduce, when determining that return of feedback information of a first data packet has timed out, a data sending rate of a connection to which the first data packet belongs from a first value to a second value, where the first data packet is a data packet sent by the terminal to a target device over a communications link, and the communications link includes a wireless link and a wired link; detect return times of feedback information of a plurality of subsequent data packets after the first data packet; determine, when detecting that the return times of the feedback information of the plurality of subsequent data packets after the first data packet meet a preset return time requirement, a cause of the timeout of the feedback information of the first data packet by using the baseband processing unit; and increase a data sending rate of the terminal from a current third value to a fourth value when determining that the timeout is caused by a packet loss on the wireless link in the communications link, where the third value is greater than or equal to the second value and is less than the first value.

In one embodiment, the fourth value is greater than or equal to the first value, or the fourth value is greater than twice the third value.

In one embodiment, the return time of the feedback information is a round trip time RTT of a data packet corresponding to the feedback information, and that the return of the feedback information of the first data packet has timed out indicates that an RTT of the first data packet has timed out; and the data sending rate of the terminal is a congestion window cwnd of the connection to which the first data packet belongs.

In one embodiment, the determining, by the application processing unit when detecting that the return times of the feedback information of the plurality of subsequent data packets after the first data packet meet a preset return time requirement, a cause of the timeout of the feedback information of the first data packet by using the baseband processing unit includes: collecting, by the baseband processing unit, the communication parameter of the wireless link in a time period in which the feedback information of the first data packet has timed out, where the time period of the timeout is a time period from sending the first data packet to the timeout of feedback information to the first data packet; obtaining, by the application processing unit, the communication parameter of the wireless link when detecting that the return times of the feedback information of the plurality of subsequent data packets after the first data packet meet the preset return time requirement; and determining, by the application processing unit, the cause of the timeout of the feedback information of the first data packet based on the communication parameter of the wireless link, where the timeout of the feedback information of the first data packet is caused by the packet loss on the wireless link or a packet loss on the wired link.

In one embodiment, the obtaining, by the application processing unit, the communication parameter of the wireless link when detecting that the return times of the feedback information of the plurality of subsequent data packets after the first data packet meet the preset return time requirement includes: sending, by the application processing unit, a first request to the baseband processing unit when detecting that the return times of the feedback information of the plurality of subsequent data packets after the first data packet meet the preset return time requirement, where the first request instructs the baseband processing unit to report the communication parameter of the wireless link; and receiving, by the application processing unit, the communication parameter of the wireless link, where the communication parameter is sent by the baseband processing unit to the application processing unit according to the first request.

In one embodiment, the obtaining, by the application processing unit, the communication parameter of the wireless link when detecting that the return times of the feedback information of the plurality of subsequent data packets after the first data packet meet the preset return time requirement includes: receiving, by the application processing unit, a plurality of communication parameters, where the plurality of communication parameters are reported by the baseband processing unit to the application processing unit when a reporting switch is in an on state; and selecting, by the application processing unit when detecting that the return times of the feedback information of the plurality of subsequent data packets after the first data packet meet the preset return time requirement, a communication parameter that is in the time period in which feedback information has timed out from the plurality of communication parameters.

In one embodiment, the determining, by the application processing chip when detecting that the return times of the feedback information of the plurality of subsequent data packets after the first data packet meet a preset return time requirement, a cause of the timeout of the feedback information of the first data packet by using the baseband processing unit includes: collecting, by the baseband processing unit, the communication parameter of the wireless link in a time period in which the feedback information of the first data packet has timed out; determining, based on the communication parameter, communication quality of the wireless link that is in the time in which the feedback information has timed out, where the time period of the timeout is a time period from sending the first data packet to the timeout of feedback information to the first data packet; determining, by the application processing unit based on the communication quality of the wireless link, a cause of the timeout of the feedback information of the first data packet when detecting that the return times of the feedback information of the plurality of subsequent data packets after the first data packet meet the preset return time requirement, where the timeout of the feedback information of the first data packet is caused by the packet loss on the wireless link or by the packet loss on the wired link.

In one embodiment, the determining, by the application processing unit when detecting that the return times of the feedback information of the plurality of subsequent data packets after the first data packet meet a preset return time requirement, a cause of the timeout of the feedback information of the first data packet by using the baseband processing unit includes: collecting, by the baseband processing unit, the communication parameter of the wireless link in a time period in which the feedback information of the first data packet has timed out; determining a cause of the timeout of feedback information to the first data packet based on the communication parameter, where the timeout of the feedback information of the first data packet is caused by the packet loss on the wireless link or by the packet loss on the wired link; and obtaining, by the application processing unit, the cause of the timeout of feedback information to the first data packet when detecting that the return times of the feedback information of the plurality of subsequent data packets after the first data packet meet the preset return time requirement.

In one embodiment, the communication parameter includes at least one of reference signal received power, reference signal received quality, a signal-to-noise ratio, and a wireless link retransmission rate.

It should be noted that, the chip provided in this embodiment of this application may specifically implement functions of the foregoing application processor and baseband processor.

Detailed above are the method and the apparatus for adjusting a data sending rate of a terminal provided in the embodiments of this application. Although the principles and implementations of this application are described through specific embodiments in this specification, the descriptions of the embodiments are only intended to help understand the method and core ideas of this application. Meanwhile, persons of ordinary skill in the art may make modifications to the specific implementations and application scopes according to the ideas of this application. To conclude, the content of the specification should not be construed as a limitation to the present invention.

What is claimed is:

1. A method for adjusting a data sending rate of a terminal, comprising:
when determining that a return time of feedback information of a first data packet has timed out, reducing, by the terminal, a data sending rate of a connection to which the first data packet belongs from a first value to a second value, wherein the first data packet is a data packet sent by the terminal to a target device over a communications link that comprises a wireless link and a wired link;
detecting, by the terminal, return times of feedback information of a plurality of subsequent data packets after the first data packet;
determining, by the terminal, a cause of the timeout of the feedback information of the first data packet when detecting that the return times of the feedback information of the plurality of subsequent data packets after the first data packet meets a preset return time requirement; and increasing, by the terminal, a data sending rate of the terminal from a current third value to a fourth value when determining that the timeout is caused by a packet loss on the wireless link in the communications link, wherein the third value is greater than or equal to the second value and is less than the first value.

2. The method according to claim 1, wherein the fourth value is greater than or equal to the first value, or the fourth value is greater than twice the third value.

3. The method according to claim 1, wherein
the return time of the feedback information of the first data packet is a round trip time (RTT) of the first data packet corresponding to the feedback information,
the return time of the feedback information of the first data packet has timed out indicating that the RTT of the first data packet has timed out, and
the data sending rate of the terminal is a congestion window of the connection to which the first data packet belongs.

4. The method according to claim 3, wherein
the terminal comprises an application processor and a baseband processor, and
determining the cause of the timeout of the feedback information of the first data packet comprises:
collecting, by the baseband processor, a communication parameter of the wireless link in a time period in which the feedback information of the first data packet has timed out, wherein the time period of the timeout is a time period from sending the first data packet to the timeout of feedback information to the first data packet,
obtaining, by the application processor, the communication parameter of the wireless link when detecting that the return times of the feedback information of the plurality of subsequent data packets after the first data packet meets the preset return time requirement, and
determining, by the application processor, the cause of the timeout of the feedback information of the first data packet based on the communication parameter of the wireless link, wherein the timeout of the feedback information of the first data packet is caused by the packet loss on the wireless link or a packet loss on the wired link.

5. The method according to claim 4, wherein obtaining the communication parameter of the wireless link comprises:
sending, by the application processor, a first request to the baseband processor when detecting that the return times of the feedback information of the plurality of subsequent data packets after the first data packet meets the preset return time requirement, wherein the first request instructs the baseband processor to report the communication parameter of the wireless link, and
receiving, by the application processor, the communication parameter of the wireless link, wherein the communication parameter is sent by the baseband processor to the application processor according to the first request.

6. The method according to claim 4, wherein obtaining the communication parameter of the wireless link comprises:
receiving, by the application processor, a plurality of communication parameters that are reported to the application processor by the baseband processor when a reporting switch is in an on state, and
when detecting that the return times of the feedback information of the plurality of subsequent data packets after the first data packet meets the preset return time requirement, selecting, by the application processor, a communication parameter that is in the time period in which feedback information has timed out from the plurality of communication parameters.

7. The method according to claim 1, wherein
the terminal comprises an application processor and a baseband processor, and
determining the cause of the timeout of the feedback information of the first data packet comprises:
collecting, by the baseband processor, a communication parameter of the wireless link in a time period in which the feedback information of the first data packet has timed out, and determining, based on the communication parameter, communication quality of the wireless link that is in the time period in which the feedback information has timed out, wherein the time period of the timeout is a time period from sending the first data packet to the timeout of feedback information to the first data packet, and
based on the communication quality of the wireless link, determining, by the application processor, a cause of the timeout of the feedback information of the first data packet when detecting that the return times of the feedback information of the plurality of subsequent data packets after the first data packet meets the preset return time requirement, wherein the timeout of the feedback information of the first data packet is caused by the packet loss on the wireless link or by the packet loss on the wired link.

8. The method according to claim 1, wherein
the terminal comprises an application processor and a baseband processor, and
determining the cause of the timeout of the feedback information of the first data packet comprises:
collecting, by the baseband processor, a communication parameter of the wireless link in a time period in which the feedback information of the first data packet has timed out, and determining a cause of the timeout of feedback information to the first data packet based on the communication parameter, wherein the timeout of the feedback information of the first data packet is caused by the packet loss on the wireless link or by the packet loss on the wired link, and
obtaining, by the application processor, the cause of the timeout of feedback information to the first data packet when detecting that the return times of the feedback information of the plurality of subsequent data packets after the first data packet meets the preset return time requirement.

9. The method according to claim 4, wherein the communication parameter comprises at least one of reference signal received power, reference signal received quality, a signal-to-noise ratio, or a wireless link retransmission rate.

10. A device operating as a terminal, comprising:
a memory, at least one processor, and a communications interface being connected by using a bus;
the memory is configured to store computer-executable instructions; and
the at least one processor is configured to invoke the instructions stored in the memory to perform a method, the method comprising:
when determining that a return time of feedback information of a first data packet has timed out, reducing a data sending rate of a connection to which the first data packet belongs from a first value to a second value, wherein the first data packet is a data packet sent by the terminal to a target device over a communications link that comprises a wireless link and a wired link;

detecting return times of feedback information of a plurality of subsequent data packets after the first data packet;

determining a cause of the timeout of the feedback information of the first data packet when detecting that the return times of the feedback information of the plurality of subsequent data packets after the first data packet meets a preset return time requirement; and increasing data sending rate of the terminal from a current third value to a fourth value when determining that the timeout is caused by a packet loss on the wireless link in the communications link, wherein the third value is greater than or equal to the second value and is less than the first value.

11. The device according to claim 10, wherein the return times of the feedback information of the first data packet is a round trip time (RTT) of the first data packet corresponding to the feedback information, and the return times of the feedback information of the first data packet has timed out indicating that the RTT of the first data packet has timed out, and the data sending rate of the terminal is a congestion window of the connection to which the first data packet belongs.

12. The device according to claim 11, wherein the at least one processor comprises an application processor and a baseband processor, and determining the cause of the timeout of the feedback information of the first data packet comprises:

collecting, by the baseband processor, a communication parameter of the wireless link in a time period in which the feedback information of the first data packet has timed out, wherein the time period of the timeout is a time period from sending the first data packet to the timeout of feedback information to the first data packet, obtaining, by the application processor, the communication parameter of the wireless link when detecting that the return times of the feedback information of the plurality of subsequent data packets after the first data packet meets the preset return time requirement, and determining, by the application processor, the cause of the timeout of the feedback information of the first data packet based on the communication parameter of the wireless link, wherein the timeout of the feedback information of the first data packet is caused by the packet loss on the wireless link or a packet loss on the wired link.

13. The device according to claim 12, wherein obtaining the communication parameter of the wireless link comprises:

sending, by the application processor, a first request to the baseband processor when detecting that the return times of the feedback information of the plurality of subsequent data packets after the first data packet meets the preset return time requirement, wherein the first request instructs the baseband processor to report the communication parameter of the wireless link, and receiving, by the application processor, the communication parameter of the wireless link, wherein the communication parameter is sent by the baseband processor to the application processor according to the first request.

14. The device according to claim 12, wherein obtaining the communication parameter of the wireless link comprises:

receiving, by the application processor, a plurality of communication parameters that are reported to the application processor by the baseband processor when a reporting switch is in an on state, and when detecting that the return times of the feedback information of the plurality of subsequent data packets after the first data packet meets the preset return time requirement, selecting, by the application processor, a communication parameter that is in the time period in which feedback information has timed out from the plurality of communication parameters.

15. The device according to claim 11, wherein the at least one processor comprises an application processor and a baseband processor, and determining the cause of the timeout of the feedback information of the first data packet comprises:

collecting, by the baseband processor, a communication parameter of the wireless link in a time period in which the feedback information of the first data packet has timed out, and determining, based on the communication parameter, communication quality of the wireless link that is in the time period in which the feedback information has timed out, wherein the time period of the timeout is a time period from sending the first data packet to the timeout of feedback information to the first data packet, and based on the communication quality of the wireless link, determining, by the application processor, a cause of the timeout of the feedback information of the first data packet when detecting that the return times of the feedback information of the plurality of subsequent data packets after the first data packet meets the preset return time requirement, wherein the timeout of the feedback information of the first data packet is caused by the packet loss on the wireless link or by the packet loss on the wired link.

16. A non-transitory computer-readable medium storing computer instructions, which when run on a computer operating as a terminal, enable the computer to perform a method, the method comprising:

when determining that a return time of feedback information of a first data packet has timed out, reducing a data sending rate of a connection to which the first data packet belongs from a first value to a second value, wherein the first data packet is a data packet sent by the terminal to a target device over a communications link that comprises a wireless link and a wired link;

detecting return times of feedback information of a plurality of subsequent data packets after the first data packet;

determining a cause of the timeout of the feedback information of the first data packet when detecting that the return times of the feedback information of the plurality of subsequent data packets after the first data packet meets a preset return time requirement; and increasing a data sending rate of the terminal from a current third value to a fourth value when determining that the timeout is caused by a packet loss on the wireless link in the communications link, wherein the third value is greater than or equal to the second value and is less than the first value.

17. The non-transitory computer-readable medium according to claim 16, wherein the return time of the feedback information of the first data packet is a round trip time (RTT) of the first data packet corresponding to the feedback information, and the return time of the feedback information of the first data packet has timed out indicating that the RTT of the first data packet has timed out, and the data sending rate of the terminal is a congestion window of the connection to which the first data packet belongs.

18. The non-transitory computer-readable medium according to claim 16, wherein the fourth value is greater than or equal to the first value, or the fourth value is greater than twice the third value.

19. The non-transitory computer-readable medium according to claim 17, wherein the computer comprises an application processor and a baseband processor, and determining the cause of the timeout of the feedback information of the first data packet comprises:

collecting, by the baseband processor, a communication parameter of the wireless link in a time period in which the feedback information of the first data packet has timed out, wherein the time period of the timeout is a time period from sending the first data packet to the timeout of feedback information to the first data packet, obtaining, by the application processor, the communication parameter of the wireless link when detecting that the return times of the feedback information of the plurality of subsequent data packets after the first data packet meets the preset return time requirement, and determining, by the application processor, the cause of the timeout of the feedback information of the first data packet based on the communication parameter of the wireless link, wherein the timeout of the feedback information of the first data packet is caused by the packet loss on the wireless link or a packet loss on the wired link.

20. The non-transitory computer-readable medium according to claim 19, wherein obtaining the communication parameter of the wireless link comprises:

sending, by the application processor, a first request to the baseband processor when detecting that the return times of the feedback information of the plurality of subsequent data packets after the first data packet meets the preset return time requirement, wherein the first request instructs the baseband processor to report the communication parameter of the wireless link, and receiving, by the application processor, the communication parameter of the wireless link that is sent by the baseband processor to the application processor according to the first request.

* * * * *